US012093890B2

(12) United States Patent
Tian

(10) Patent No.: US 12,093,890 B2
(45) Date of Patent: Sep. 17, 2024

(54) SYSTEM AND METHOD OF SMART AUTO-VENDING IN PANDEMIC

(71) Applicant: Jiawei Tian, Richmond Hill (CA)

(72) Inventor: Jiawei Tian, Richmond Hill (CA)

( * ) Notice: Subject to any disclaimer, the term of this patent is extended or adjusted under 35 U.S.C. 154(b) by 31 days.

(21) Appl. No.: 17/958,329

(22) Filed: Oct. 1, 2022

(65) Prior Publication Data

US 2023/0107899 A1    Apr. 6, 2023

Related U.S. Application Data

(60) Provisional application No. 63/251,938, filed on Oct. 4, 2021.

(51) Int. Cl.
*G06Q 10/087* (2023.01)
*B65G 67/08* (2006.01)

(52) U.S. Cl.
CPC ........... *G06Q 10/087* (2013.01); *B65G 67/08* (2013.01)

(58) Field of Classification Search
CPC ...... G06Q 10/087; G06Q 10/08; B65G 67/08; B65B 5/08; B65B 5/10; B65B 57/00; B65B 59/00
See application file for complete search history.

(56) References Cited

U.S. PATENT DOCUMENTS

| 10,706,387 | B1* | 7/2020 | Cui | G06F 30/10 |
| 2002/0123918 | A1* | 9/2002 | Brown | G06Q 10/06 705/28 |
| 2006/0206235 | A1* | 9/2006 | Shakes | B65G 1/1378 700/216 |
| 2007/0150383 | A1* | 6/2007 | Shakes | G06Q 10/0875 705/29 |
| 2007/0226088 | A1* | 9/2007 | Miles | G06Q 10/10 705/28 |
| 2019/0108604 | A1* | 4/2019 | Friedl | B65G 1/16 |
| 2020/0334628 | A1* | 10/2020 | Goldberg | G06Q 30/0633 |
| 2024/0052282 | A1* | 2/2024 | Granucci | A23L 7/104 |
| 2024/0091955 | A1* | 3/2024 | Maggiore | B25J 11/008 |
| 2024/0094708 | A1* | 3/2024 | Marques | G06Q 10/08 |

* cited by examiner

*Primary Examiner* — Joshua E Rodden

(57) ABSTRACT

The present disclosure provides a system and method for smart auto-vending during a pandemic. The purpose is to increase efficiency in order fulfillment of prepacked and non-prepacked products in terms of speed, low cost, and sterilization. The system includes: a box station; dispensers/ dispensing subsystems; sterilization stations with different sterilization methods; a packaging station with different packaging methods; a shipping station for smart shipping with automatic self-driving vehicles or drones; a main conveyor and sub-conveyors that move an order through the system. In addition, there may be one dispensing subsystem for weighing, bagging, and sterilizing non-prepackaged grocery products. The system's AI function is also used to optimize items stored in each dispenser/dispensing subsystem. All of these components and methods come together to form an integrated, streamlined, and optimized system and method for carrying out online order fulfillment efficiently.

20 Claims, 14 Drawing Sheets

SYSTEM AND METHOD OF SMART AUTO-VENDING IN PANDEMIC

CROSS-REFERENCE TO RELATED APPLICATIONS

This non-provisional application claims the benefit of U.S. Provisional Patent Application No. 63/251,938, filed Oct. 4, 2021. The entire disclosure of the above application is incorporated herein by reference.

FIELD

The present disclosure is in the field of automatic vending, vending machines, distribution systems, order fulfillment, automated methods for sterilization, logistics, and especially, a smart automated vending system in pandemics, including smart dispensing of prepacked and/or non-prepacked products.

BACKGROUND

Order fulfillment for e-commerce is a process involving receiving a customer's online order, processing the order, and delivering it to the customer's doorstep. Customers may place their online order through a digital device such as a computer or smart mobile device. The order is then received and processed in a fulfillment center or warehouse. A customer's order could contain one or more product types (e.g., electronic devices, food, etc.); and each product type could contain a unit quantity of products (e.g., food includes one apple or three-hundred oranges). Not losing generality, hereinafter in the present disclosure, all descriptions only refer to a customer order that contains more than one product unit but should still apply to a customer order that contains a single unit of the product. Additionally, the term 'product' is also interchangeable with 'product item' or simply 'item'.

Existing order fulfillment has already been partially automated and streamlined to some degree as a means to save time and costs. For example, products are retrieved using robots, which are then actively delivered to a picking-up area or placed on a conveyor belt leading to that area. Some systems use automatic or semi-automatic dispensers to dispense products into boxes, totes, or directly onto a moving conveyor belt. Such order fulfillment systems are hereinafter called 'auto-vending systems.

However, existing auto or semi-auto vending systems and methods are not designed to function well in a pandemic setting, such as the COVID-19 pandemic. This is one of several major problems with existing auto-vending systems and other order fulfillment systems. Much of the order fulfillment process still requires personnel for tasks such as order picking, packaging, and shipping. The term 'personnel' refers to a body of employed persons, which in this case, would be warehouse and distribution workers. Not only may germs and viruses spread among those workers, but also the viruses may contaminate the products ordered and shipped, therefore, spread outside from the warehouse and fulfillment system. Existing fully auto-vending systems slightly mitigate that, as the handling/picking of products is not done by humans in this case; however, a fully automatic vending system still cannot ensure all the shipments are virus free.

Disinfection or sterilization of products is not typically an emphasis in the order fulfillment process of existing systems. At most, existing systems may implement a means to disinfect certain products for medical purposes, often exclusively for special products. Most systems that do this may (1) require manual labor during the process; (2) and/or be inflexible when different products require completely different methods of disinfection; (3) be ineffective at disinfecting occluded surfaces or nested boxes.

The second major problem is that current order fulfillment systems can be inefficient. For example, some systems retrieve products from their storage manually. This wastes time and delays order fulfillment, especially if the order volume is high. Existing auto-vending systems mitigate that by using an automatic product dispenser. However, the dispensing is not flexible and well tracked, especially when the product requires sanitization for pandemic reason.

A third major problem, related to the previous problem, is that current order fulfillment systems do not optimize the dispensing locations of the products according to the market trend. In the case of auto-vending systems, this means that there is no dynamic change to product dispensers. With a large inventory in warehouse settings, there are a lot of items to go through. It becomes difficult to decide what products to store for retrieval or dispensing. In non-vending systems, products are stored in shelves or bins, which need to be shipped over to an order picker to sort into an order box. There are existing systems with robots to pick the item, but there is a need to go through individual bins or shelves to get the required item, which takes time and is inefficient.

The fourth major problem involves costs associated with traditional order fulfillment systems. This can be in the form of labor, shipping, and equipment costs. As noted, labor costs also come from the people that work in the warehouse environment. The more people in the warehouse, the more costs it will be. A second example involves shipping costs for delivery. Existing systems do not have a way to automatically choose the best box for each order, although some have a way of automatically preparing a shipping mailer if an order is small enough. Order fulfillment systems that automatically generate a box are limited to one box size; this may keep shipping costs consistent, but the selected box may not be the most optimal for an order. Furthermore, existing systems are not designed to automatically determine the best packaging arrangement and material filler simultaneously. Some systems use a robot arm to aid with packaging arrangement. There are also loose filler dispensers that fill in the space of the packaging box, but this could lead to a waste in the amount of filler used and lead to higher material costs. An optimal packaging (best arrangement and least amount of packaging material) is still done manually, which amounts to extra labor costs.

Existing order fulfillment systems are primarily designed for the order fulfillment of prepacked items. Automated systems for grocery products do exist, but they typically do not operate in a systematic way and have great limitations. Hereinafter, 'grocery products' can be referred to as 'non-prepacked products'. One example includes a retail supermarket with robots to get grocery products. Another example comprises singular automated grocery vending machines. However, these machines only dispense prepacked groceries with predetermined weights.

Order fulfillment for grocery products can be done on a larger scale, but such systems face many of the same challenges as traditional order fulfillment systems. Like with automated grocery vending machines, there is no way to automatically sanitize and customize the weight of a non-prepacked items like fruits and vegetables. Bagging is also not done until after the product is handled, which may potentially cause germs and viruses to spread. Overall, there is a need for an integrated, streamlined order fulfillment system and methods that increase safety against viruses like COVID-19, increase speed and reduce costs in the order fulfillment process, can optimally store products based on changing trends, and can fulfill orders containing mixed prepacked and non-prepacked grocery products.

The present disclosure provides a novel system and methods for a smart automated vending system in pandemic conditions for smart dispensing, sterilization, packaging, and delivery of orders containing prepacked and/or non-prepacked goods. The present disclosure improves upon existing systems by: (1) increasing safety against viruses during a pandemic by smart sterilization; (2) increasing overall speed in the order fulfillment process (e.g., optimized dispensing to reduce order fulfillment time); (3) reducing costs in the order fulfillment process (e.g., reduced box size for reduced shipping cost); (4) readily adapting to frequently changing trends in products sold for sustained optimization; (5) improving efficiency, low cost, speed, and reliability for integrated smart delivery without human beings.

SUMMARY

The present disclosure provides a novel system and methods for smart automated vending for a pandemic. The purpose of the design is to increase efficiency in the order fulfillment of prepacked and non-prepacked products with a quick, low-cost, reliable, and virus-free system. The present disclosure includes the following major inventive aspects: (1) a smart dispensing method by optimizing items stored in each dispenser or dispensing subsystem; (2) a method for automated smart sterilization; (3) a method for automated smart packaging; (4) a method of automated shipping using self-driving vehicles and drones; (5) a dedicated subsystem for the dispensing, packaging, and sterilization of non-prepacked grocery products; (6) an integrated streamlined and optimized workflow for improved dispensing, sterilizing, packaging, and shipping of both prepacked and non-prepacked products.

The present disclosure describes an auto-vending system with an integrated, streamlined, and optimized workflow for the fulfillment of a customer's order. The system is designed in a way that is suited for a pandemic where minimal or no human involvement is required. The system has designated areas or stations with methods for automated smart dispensing, sterilization, packaging, and delivery of prepacked and non-prepacked goods. These methods are carried out using artificial intelligence (AI) in the system. The areas within the system are designed so that order fulfillment can be done in a single direction via a main conveyor.

The customer orders their desired products from a website. The system then receives and processes the order. The AI determines the most appropriate shipping box for storing the requested products, which the box station prepares with a scannable code containing the information required. The shipping box is brought to the box sterilization station to be sterilized. The shipping box is then transported to the dispensing areas, where a plurality of products is dispensed. Each dispensing area contains several individual dispensers and/or dispensing subsystems, which are sequentially ordered to reflect product popularity on the market. If a dispensing subsystem is used, it may further contain: a plurality of dispensers that dispense products; a subsystem sterilization station to sterilize the products; a subsystem conveyor above the main conveyor to transport the dispensed products; a subsystem chute to dispense products into a shipping box on the main conveyor; and a subsystem sensor that scans the code on the shipping box to determine which products are dispensed.

Each dispenser comprises an individual unit with an opening at the bottom front side. A dispenser gate covers the opening of the dispenser, which moves upward when products need to be dispensed. A dispenser chute in front of the dispenser lets the product slide into the shipping box (if the dispensing area only has individual dispensers) or onto a subsystem conveyor (if there are dispensing subsystems present). A sensor, located at the bottom of the dispenser chute, confirms the products in the order. In the case of individual dispensers, the sensor also scans the box.

A plurality of products is stored in the dispensers, which are changed regularly using a method for auto-dispensing that optimizes which items are stored in said dispensers. Each dispenser or subsystem is arranged in sequential order for storing products based on their popularity. The placement of products in the dispensers changes regularly to reflect changing trends.

When a box is moved to one dispensing area, each dispenser sensor or subsystem sensor scans the code on the shipping box. The required products are dispensed through each dispenser or dispenser within a dispensing subsystem, starting with the one closest to the start of the system. A dispenser sensor scans the products to confirm that they are part of the order. This repeats with each dispenser present in the dispensing area until all required products are dispensed. The box moves to the next dispensing area, where the same dispensing procedure occurs.

All products then require sterilization. If there are only individual dispensers in the dispensing areas, the products are already sterilized prior to storage in the dispensers. In the case of dispensing subsystems, dispensed products go through to a subsystem sterilization station, where the AI uses a method for automated smart sterilization to find the best sterilization method for each product. A sensor examines the dispensed products; two sorting robots move each product to their optimal sterilization method. The sterilization methods comprise the following: an ultraviolet light (UV) sterilization chamber; a heat sterilization chamber; a spray sterilization chamber; a manual cleaning station with one manual sterilization worker. Once the products are sterilized, they move out of the sterilization station and are then dispensed into the box.

Although many products in the system are prepacked items, the auto-vending system can also handle non-prepacked grocery products such as fruits and vegetables. The system has at least one dispensing subsystem dedicated to the dispensing, bagging, and sterilizing of such non-prepacked grocery products within the auto-vending system. A grocery subsystem conveyor scale weighs dispensed non-prepacked grocery products, as such products do not have predetermined weights. The products are then transferred to a bagging station, where they are placed in an open grocery bag. Once the grocery bag is filled up with all ordered products or up to capacity, it is sealed with the grocery products inside. Any remaining grocery products are bagged and sealed in additional bags in the same manner described before. The sealed grocery orders are then sterilized at the subsystem sterilization station and dispensed into the shipping box in the same way as prepacked products.

Upon receiving the required products from the dispensers or dispensing subsystems, the shipping box is transported to the packaging area. A method for automated smart packaging may be used to pack and seal the box, which is based on whether rearrangement is configured. In a preferred embodiment, the box is filled with loose packaging material, such as packing peanuts, to ensure that all the gaps within the shipping box are filled. In an alternative embodiment, a packaging robot arranges the products within the shipping box to be optimally packed within the shipping box's interior space. Air cushions are then used to fill the remaining interior spaces of the box. The box is then sealed and tagged at the box packaging station to tell the system that the order has been fulfilled. In rare cases, another embodiment involves the use of packaging personnel to rearrange products in the shipping box and to seal and tag the box.

The shipping box finally moves to the shipping area, where a method for automated shipping is applied. First, the box (with the dispensed products) is weighed on the shipping area conveyor scale. The box then moves to the shipping area station, where the tag on the box is scanned. The AI then makes an itinerary for an optimized delivery route and determines the most optimal vehicle to use. To help with suitability in a pandemic, the AI will typically choose an autonomous self-driving vehicle or a delivery drone. Factors that are taken into consideration mainly include the weight of the box, the distance of delivery, and whether drones are legal in the area of the intended shipping address. In rare cases, however, a person loads the box into a postal service vehicle. Regardless of the chosen means of delivery, the package is then delivered to its intended destination.

By using the systems and methods of the auto-vending system, the overall experience of order fulfillment of pre-packed and non-prepacked products in a pandemic is improved, as it solves the following problems: (1) increases safety against viruses during a pandemic by smart sterilization; (2) increases overall speed in the order fulfillment process (e.g., optimized dispensing to reduce order fulfillment time); (3) reduces costs in the order fulfillment process (e.g., reduced box size for reduced shipping cost); (4) readily adapts to frequently changing trends in products sold for sustained optimization; (5) improves efficiency, low cost, speed, and reliability for integrated smart delivery without human beings.

BRIEF DESCRIPTION OF THE DRAWINGS

The accompanying drawings, which are included to provide a further understanding of the invention and are incorporated in and constitute a part of this application, illustrate embodiments of the present disclosure and, together with the description, serve to explain the principle of the invention. For simplicity and clarity, the figures of the present disclosure illustrate a general manner of construction of various embodiments. Descriptions and details of well-known features and techniques may be omitted to avoid unnecessarily obscuring the discussion of the present disclosure's described embodiments. It should be understood that the elements of the figures are not necessarily drawn to scale. Some elements' dimensions may be exaggerated relative to other elements for enhancing the understanding of described embodiments. In the drawings.

DETAILED DESCRIPTION

Figure 1:
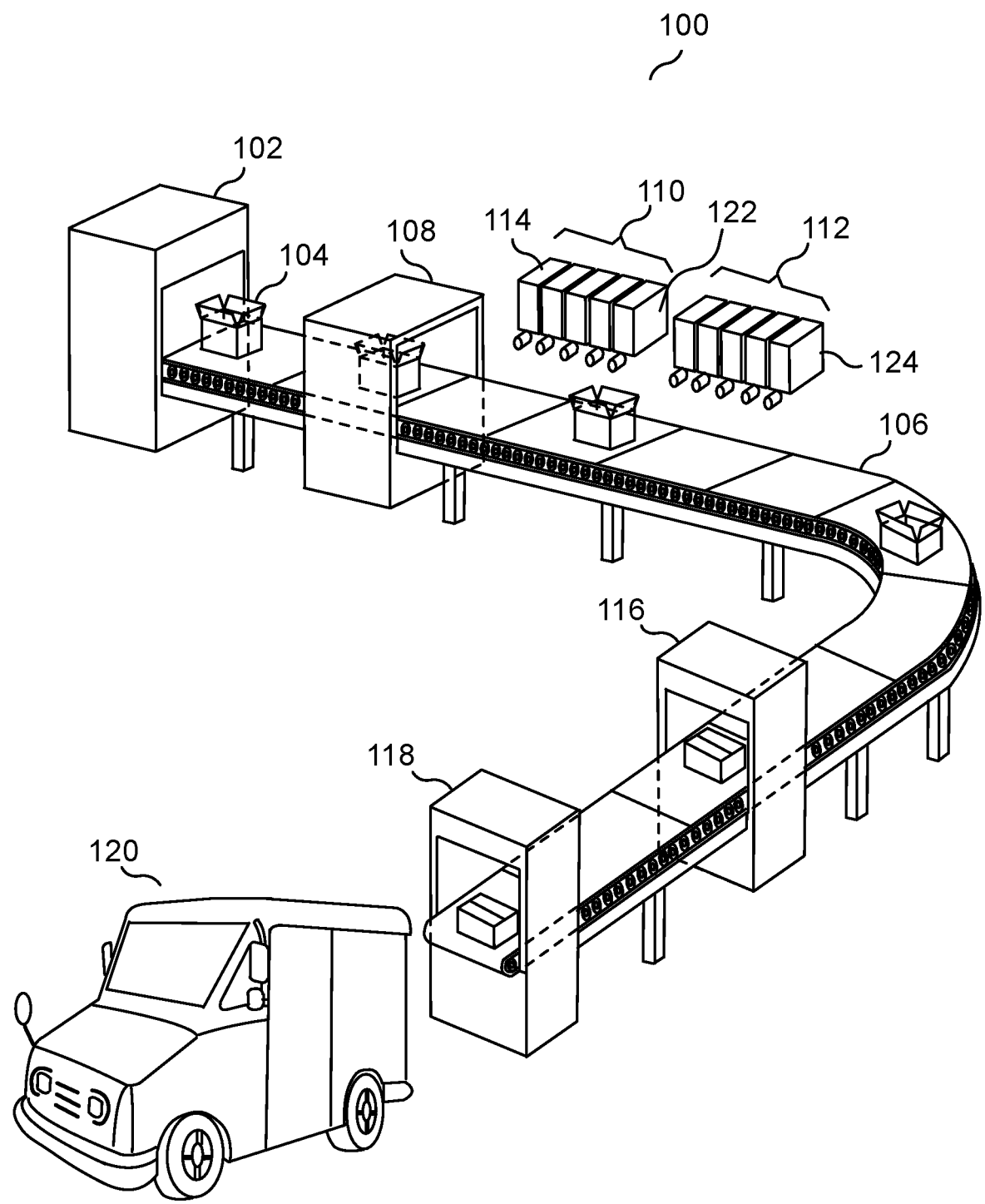
FIG. 1 illustrates a general overview of a preferred smart auto-vending system.

The present disclosure provides a novel system and methods for smart automated vending for a pandemic. Various examples of the present invention are shown in the figures. However, the present invention is not limited to the illustrated embodiments. In the following description, specific details are mentioned to give a complete understanding of the present disclosure. However, it may likely be evident to a person of ordinary skill in the art; hence, the present disclosure may be applied without mentioning these specific details. The present disclosure is represented as few embodiments; however, the disclosure is not necessarily limited to the particular embodiments illustrated by the figures or description below.

The language employed herein only describes particular embodiments; however, it is not limited to the disclosure's specific embodiments. The terms "they", "he/she", or "he or she" are used interchangeably because "they", "them", or "their" are considered singular gender-neutral pronouns. The terms "comprise" and/or "comprising" in this specification are intended to specify the presence of stated features, steps, operations, elements, and/or components; however, they do not exclude the presence or addition of other features, steps, operations, elements, components, or groups.

Unless otherwise defined, all terminology used herein, including technical and scientific terms, have the same definition as what is commonly understood by a person of ordinary skill in the art, typically to whom this disclosure belongs. It will be further understood that terms, such as those defined in commonly used dictionaries, should be interpreted as having the same meaning as defined in the context of the relevant art and the present disclosure. Such terms should not be construed in an overly strict sense unless explicitly described herein. It should be understood that multiple techniques and steps are disclosed in the description, each with its own benefit. Each technique or step can also be utilized in conjunction with a single, multiple, or all of the other disclosed techniques or steps. For brevity, the description will avoid repeating each possible combination of the steps unnecessarily. Nonetheless, it should be understood that such combinations are within the scope of the disclosure. Reference will now be made in detail to some embodiments of the present invention, examples of which are illustrated in the accompanying figures.

The smart auto-vending system comprises many designated stations or areas with methods for optimally fulfilling a customer's order. Generally, the order fulfillment process with the smart auto-vending system comprises the formation and sterilization of a shipping box, dispensing of products, sterilizing of products, packaging of the order, and shipping of the order to the customer. The smart auto-vending system is integrated into a streamlined fashion for optimal order fulfillment. Once the customer purchases their desired products and the order is received, the system determines the most optimal method for dispensing, sterilizing, packaging, and shipping a myriad of products in each order. More specifically, an AI within the system determines the most optimal methods for smart dispensing, sterilizing, packaging, and shipping. As a result, these order fulfillment methods can be considered 'automated smart methods'. Since the AI is part of the system, hereinafter, the term 'AI' can be used interchangeably with 'system' when describing the decision-making element for automated actions carried out in the order fulfillment process (e.g., choosing the most optimal method for dispensing, sterilizing, packaging, and shipping).

Prepacked and non-prepacked products are stored within the dispensing areas, which are grouped based on how frequently they appear in the processed orders. There are two dispensing areas in the present disclosure: one for frequently-sold products and another for infrequently-sold products. Each dispensing area consists of solely independent dispensers or dispensing subsystems containing a plurality of dispensers. Depending on the embodiment, either case may apply.

Each dispenser comprises a rectangular machine with multiple components: 1) the dispenser itself is instructed by the system's AI to dispense products. The dispenser has a hollow interior space with a tilted interior base, so products can slide into a shipping box or onto a conveyor when being dispensed. The dispensers have side and rear openings that allow products to be stored inside the dispenser; such openings are covered by side and rear panels respectively; 2) a cylindrical dispenser chute is welded to the bottom front side of the dispenser, which allows dispensed products to slide into a shipping box or onto a conveyor; 3) a dispenser gate is located at the bottom front side of the dispenser, which seals the opening on the dispenser's bottom front side. When a product in the dispenser is required in an order, the dispenser gate moves upward for a period of time to let a required quantity of a product dispense through the chute into a shipping box or onto a conveyor. Once the required products are dispensed, the dispenser gate moves downward to its initial closed position; (4) a sensor is located below the front opening of an associated dispenser chute. The sensor scans dispensed products as they exit through the dispenser chute to confirm that they are part of an order. If individual dispensers are present, the sensor can scan the code of a shipping box to see if the product is required in an order. In this case, the shipping box would directly receive the product before moving on to the next dispenser.

A dispensing subsystem is situated above the main system within a dispensing area with its own workflow to transport products into a shipping box on the main conveyor. A dispensing subsystem may contain one dispenser holding one product or multiple dispensers holding multiple products. Each subsystem has its own subsystem conveyor and subsystem chute to dispense products from the subsystem's dispensers into a shipping box on the main conveyor. A sensor below the front opening of the subsystem chute scans a code on the shipping box. The required products are dispensed from each dispenser in sequential order onto the subsystem conveyor, with dispenser sensors from each dispenser unit confirming that the associated products are part of an order. Once all required products are dispensed, they are brought to a subsystem sterilization station; this will be explained in further detail in the upcoming paragraphs. Then, the products go through the subsystem chute to be dispensed into the shipping box.

Prepacked and non-prepacked products are held separate from each other: a typical dispenser or dispensing subsystem holds prepacked items. While a dispenser or dispensing subsystem for non-prepacked grocery products can hereinafter be referred to as 'grocery dispenser' or 'grocery dispensing system' respectively; the description of the smart auto-vending system's working with non-prepacked grocery products will be further explained in future paragraphs.

The present disclosure has a few notable aspects. The first aspect is an automated smart dispensing method, which optimizes product arrangement within dispensers or dispensing subsystems. Each dispenser/subsystem is designated an N value in sequential order. In other words, the next dispenser/subsystem is designated as (N=N+1). In the case of dispensing subsystems with more than one dispenser, N values are assigned to dispensers amongst all dispensing subsystems; this will be further explained in future figures. The AI determines which product goes into which dispenser/subsystem based on the products' Nth popularity. For example, the most popular product goes into the first dispenser/subsystem (N=1) closest to the start of the system and workflow. As the most popular products change, the products in one dispenser/subsystem may be emptied and transferred to another dispenser/subsystem that corresponds to their Nth popularity. This change is done regularly, typically daily.

The second aspect of the present disclosure is a method for automated smart sterilization, also referred to as the 'automated smart sterilization aspect'. This is carried out in two situations: (1) at the beginning of the order fulfillment process, where a prepared shipping box goes through a box sterilization station to be disinfected with UV light; (2) when all required products are dispensed from the dispensers/subsystems. If the system only has individual dispensers present, the products are already sterilized prior to storage in the dispensers. Within a subsystem, there is a subsystem sterilization station to carry out multiple methods of sterilization. Products are first transported to the subsystem sterilization station via the subsystem conveyor. A sensor from the AI then examines the dispensed product, and the AI determines the best sterilization method for each product. Two sorting robots move each product to a conveyor subsection leading to the appropriate sterilization method. Three of these methods involve sterilization chambers using UV light, heat, and a chemical spray. Additionally, some products are moved to a conveyor subsection for manual cleaning by a manual sterilization worker—this area is known as the manual cleaning station.

The third aspect of the present disclosure is a dedicated dispensing subsystem for non-prepacked grocery products, also referred to as the 'grocery subsystem'. This subsystem has a similar setup to that of a typical dispensing subsystem for prepacked items. However, there are a few key differences: (1) the beginning of the subsystem has guard rails to prevent products from rolling off the subsystem conveyor; (2) there is a grocery subsystem conveyor scale that weighs each product since the products dispensed here do not have a prepackaged weight. The system dispenses as much of a given non-prepacked item to match the requested weight in the customer's order; (3) a bagging station is present within the subsystem. This station has an attached storage compartment that stores a plurality of grocery bags to store non-prepacked products. The bagging station dispenses one bag from the storage compartment and opens up the bag to ready it for placing non-prepacked items inside. Once the grocery bag is filled up with all ordered products or up to capacity, it is sealed with the products inside. For larger orders, any remaining grocery products in the order are then bagged and sealed in additional bags until all non-prepacked grocery products are stored and sealed in the grocery bags. Grocery bags containing non-prepacked grocery products are hereinafter called 'grocery orders'.

The fourth aspect is an automated method for smart packaging, also referred to as the 'automated smart packaging aspect'. The first part of the aspect can be seen at the beginning of the auto-vending system's order fulfillment process. The AI determines the best box size to best fit the products in the order; the box station forms the required box at the beginning of the order fulfillment process. In the second part of the aspect, when a shipping box has the required products, it is sent to the packaging station.

Hereinafter, the term 'packaging station' is interchangeable with 'packaging area'. Here, the AI determines how to pack and seal the box. The automated method varies depending on whether rearrangement is configured for the order. In the preferred embodiment, rearrangement is not configured for the order. Here, the box is transported under a loose filler dispenser. Loose packaging material, such as packing peanuts, is dispensed as filler into the shipping box to fill up the gaps left by the products in the box. In an alternative embodiment, rearrangement is configured for the order. A packaging robot arranges the products within the shipping box in a way that optimally takes up the least space inside the box. At the same time, an air cushion machine in the packaging area generates air cushions that are packed into the box to fill the remaining interior spaces of the box. The box is then sealed at the box packaging station and a shipping tag is then placed on the box. At this point, the system acknowledges that the order has been fulfilled. In yet another alternative embodiment, two packaging workers are present at the packaging area: one for rearranging the products in the shipping box and another for sealing and tagging the box.

The fifth aspect is an automated method for smart shipping, also referred to as the 'automated smart shipping'. Once the shipping box is sealed and tagged at the packaging station, it is transferred to the shipping station or shipping area. Here, the shipping box moves onto the shipping area conveyor scale, where the order is weighed. The box then moves to the delivery station, where the tag on the box is scanned. The AI in the system then creates an itinerary to determine the fastest and shortest route. Considering that the order will be shipped with several others, the AI in the system also determines the priority of the order's delivery. The AI also determines the most optimal vehicle to use. To help with suitability in a pandemic, the AI will typically choose an autonomous self-driving vehicle or a delivery drone. Factors that are taken into consideration mainly include the weight of the box, the distance of delivery, and whether drones are legal in the area of the intended shipping address. In cases where an automated means of delivery is not allowed or requested, a person loads the box into a postal service vehicle. Regardless of the chosen means of delivery, the package is then delivered to its intended destination.

The sixth aspect combines all the previously mentioned aspects into an integrated, streamlined, and optimized workflow that allows an order to be simply fulfilled. In other words, the process starts from the system receiving the order and ends at the delivery of the order to the customer. All areas of the smart auto-vending system are placed in a particular order to move in a single direction without the need to backtrack or go outside the system. The main conveyor is set up in a way to facilitate this streamlined workflow for the auto-vending system. In some ways, the main conveyor is a link to all the areas of the smart auto-vending system. This integrated, streamlined, and optimized workflow also applies to both the dispensing subsystem and the grocery dispensing subsystem, where products are dispensed, handled, and sterilized in an order that moves in a single direction via their respective subsystem conveyor. The dispensing subsystems (regular or grocery) are placed above the main system in a way that they can be integrated seamlessly into the system's workflow. In a sense, the subsystems are considered sub-steps in the order fulfillment process. The aspect relating to the optimization among dispensers/dispensing subsystems is also linked to the novel workflow since more popular items can be dispensed more promptly without the need to backtrack in the system's workflow. The system's AI plays a role in the streamlining and optimizing of the workflow since it determines the most optimal parameters for the fulfillment of a customer's order (e.g., box size, sterilization methods, packaging, shipping, etc.) prior to the execution of any given step in the order fulfillment process.

The smart auto-vending system and methods address problems previously found in existing order fulfillment systems, especially auto-vending systems. First and most importantly, smart auto-vending in the present disclosure increases safety against germs and viruses during a pandemic. All aspects of the system are primarily automated thanks to the system's AI that controls everything in the order fulfillment process. Within the integrated and streamlined workflow, the dispensers/subsystems can scan a shipping box using dispenser/subsystem sensors to dispense and confirm the required products. Thanks to the method of automated smart sterilization, the system can determine the optimal means of sterilization and send dispensed products to the appropriate subsection for sterilization (appropriate sterilization chamber or manual wiping station). Additionally, the shipping box is also sterilized at the box sterilization station right after being prepared at the box station. With the grocery subsystem aspect, non-prepacked items are not picked/handled by human hands. Additionally, the bagging station in the grocery dispensing subsystem automatically places and seals the products into at least one grocery bag. The method for automated smart packaging uses an automatic loose filler dispenser or a packaging robot, depending on the embodiment. The method for automated smart shipping involves an AI creating an itinerary for the fastest and shortest delivery use, primarily with delivery drones or autonomous self-driving vehicles. Rarely will personnel be involved, so the risk of spreading germs and viruses is minimal.

Second, the overall speed of the order fulfillment process is increased using this auto-vending system. Many of the aspects play a role in increasing order fulfillment speed. Broadly speaking, the system is designed with an integrated, streamlined, and optimized workflow, so that orders can quickly move in a single direction from the box station to the shipping area Even dispensing subsystems for prepacked and non-prepacked grocery products have their own streamlined order of components to move dispensed products along. The system's AI takes minimal time to decide the most optimal method for carrying out smart dispensing, smart sterilization, packaging, and shipping. With the automated smart sterilization aspect, the products are moved to the appropriate area within the subsystem sterilization station. The products generally get sterilized before entering the box, so order fulfillment can move forward without the need to backtrack or be removed from the system and associated subsystem. For most products, the subsystem conveyor just moves most products through a UV light, heat, or spray sterilization chamber. If prearrangement is not confirmed for an order, the automated smart packaging aspect just pours loose packaging material like packing peanuts or any other filler material to fill the gaps in the shipping box; time is not needed to arrange products inside the box unless prearrangement is configured. The automated smart shipping aspect increases speed by having the AI determine the fastest and quickest route to the customer's address. With the automated smart dispensing method, items are optimally arranged within dispensers/subsystems. Products are stored in sequential dispensers/subsystems based on their popularity. So, the most popular item will be stored in the dispenser/subsystem closest to the start of the system (N=1), the second most popular item will be stored in the adjacent dispenser/subsystem (N=N+1), and so forth. In some sense, this method is linked to the integrated, streamlined, and optimized workflow aspect to help speed up the dispensing process. In the present disclosure, this is also observed on a broader level with dispensing areas categorized as 'frequent' and 'infrequent'. This streamlined sequential order may help move orders along more quickly and reduce order fulfillment time. This way, more popular products can be dispensed sooner. If all the products of a specific order have been dispensed, then the shipping box can take a shortcut to arrive at the next station/area faster, therefore save the overall order fulfillment time.

Third, the costs of operating such a system are reduced. All the aforementioned aspects play a role in reducing monetary costs. Particularly, labor costs are significantly reduced thanks to the automated aspects of the auto-vending system. Only a few people are needed: a manual sterilization worker for each subsystem, first and second packaging workers, and a delivery person. Even then, they are only needed in certain situations where automated methods are not suitable. When it comes to packaging, the AI chooses the box size for any given order at the box station. As a result, the shipping cost can be reduced. The automated smart packaging aspect plays a role in reducing costs since the AI determines the best amount of packaging material for an order so that the shipping box is completely filled without wasting extra materials. The automated smart shipping aspect also contributes to reduced costs by the itinerary generated by the AI. Here, the shortest distance and time for delivery are determined to further reduce shipping costs. Furthermore, the box size selected earlier makes it more likely for delivery to occur via a delivery drone or an autonomous self-driving vehicle.

Fourth, the present disclosure can adapt to frequently changing trends in products sold for sustained optimization. This is thanks to the aspect relating to the smart dispensing method to optimize product storage in the dispensers/subsystems. As the popularity of items frequently changes, the AI changes which products go into which dispenser/dispensing subsystem on a regular basis. If a product is no longer the Nth most popular, it is removed from its corresponding dispenser (N) and is replaced with the product considered the 'Nth most popular' at that given time.

Fifth, there is improved efficiency, lower cost, faster speed, and reliability in shipping for integrated smart delivery without human beings. This is thanks to two aspects: the integrated, streamlined, and optimized workflow combines all other aspects together in an optimized fashion to improve the whole order fulfillment process; the automated smart shipping aspect uses the AI in the system to determine the fastest and shortest route to the customer to improve the delivery experience. For most orders, the AI also selects an automatic means of delivery, such as a delivery drone or an automated self-driving vehicle.

FIG. 1 illustrates a general overview of a preferred smart auto-vending system. The system (100) begins with a box station (102) preparing an open shipping box (104) with a scannable code. The shipping box (104) then moves forward on the main conveyor (106) toward the box sterilization station (108). Here, the box (104) goes through the box sterilization station (108) to be disinfected. For example, disinfection is achieved by using UV light. The box (104) then travels along the main conveyor (106) toward a first dispensing area (110) and a second dispensing area (112). Each dispensing area (110, 112) comprises individual dispensers (122) or dispensing subsystems (114, 124). Each dispensing subsystem (114, 124) may further contain one or more dispensers (122). A typical dispensing subsystem (114) holds prepacked products. A modified grocery dispensing subsystem (124) instead holds non-prepacked products, like groceries. The dispensers (122) or dispensing subsystems (114, 124) have a sensor to scan the code on the shipping box (104). The dispensers (122) or dispensing subsystems (114, 124) then dispense a required quantity of the products into the box (104). The box (104) is then transported on the main conveyor (106) that loops around toward the packaging station or area (116), where the box (104) is packaged, sealed, and tagged. The box (104) then moves along the main conveyor (106) toward the shipping station or area (118), where it is scanned to determine the optimal type and itinerary for delivery. The box (104) is then stored inside the postal service vehicle (120), or other transportation means for delivery.

For the purpose of brevity, the dispensing areas (110, 112), packaging station (116), and shipping station (118) are shown as simplified abstractions in the figure to demonstrate their integration into the smart auto-vending system (100) as a whole. Details regarding these areas (110, 112, 116, 118) will be shown and explained further in future figures.

FIG. 1 exemplifies the aspect relating to an integrated, streamlined, and optimized workflow. Each area/station is placed in a particular order to quickly fulfill a customer's order after it has been processed in the smart auto-vending system (100), from the preparation of the shipping box (104) at the box station (102) to the delivery of the box (104) via the postal service vehicle (120). As a result, order fulfillment becomes faster, more efficient, and more reliable. The sped-up order fulfillment process also helps with the automatic delivery of a customer's order because it can get to the customer more quickly. The streamlined workflow can also be attributed to the main conveyor (106) that runs throughout the smart auto-vending system (100). In a sense, the conveyor (106) connects all the areas (102, 106, 110, 112, 116, 118) of the smart auto-vending system (100) together into one integrated system.

Increased safety from germs and viruses can be achieved with the smart auto-vending system (100) in two ways. First, the prepared shipping box (104) goes through the box sterilization station (108) for quick and effective disinfection. Second, the dispensing subsystems (114, 124) have a subsystem for automated smart sterilization of the dispensed products; this will be further shown and explained in future figures, most notably FIG. 5 and FIG. 10.

The main conveyor (106) is shown as a simplified design that curves as such. However, this is only for exemplary purpose, the main conveyor (106) can be with any length, in any shape, and of any other design; e.g., multiple curves, loops, and sections with higher or lower elevations. The main conveyor (106) is shown as a conventional belt conveyor with wheels or pulleys that drive the movement of a conveyor belt, and the shipping box (104). Support legs are also shown at different intervals below the main conveyor (106) as a means of support. In another embodiment, an alternative type of conveyor may be used, such as a gravity roller conveyor, or a chain conveyor. Another embodiment may have the main conveyor (106) hanging from the ceiling of a warehouse. In yet another embodiment, guard rails may be installed on the sides to keep the shipping box (104) in place as it moves along the main conveyor (106).

The dispensing areas (110, 112) in this figure may consist of either individual dispensers (122) or abstract representations of dispensing subsystems (114, 124) depending on the embodiment. With dispensing subsystems (114, 124), each dispensing area (110, 112) has at least one dispensing subsystem (114) for prepacked products and one grocery dispensing subsystem (124) for non-prepacked products. The system (100) uses an AI to determine which products go into which dispensers (122) and/or dispensing subsystems (114, 124). In doing so, the system (100) is able to adapt to changing trends in the popularity of their products; this will be shown and explained further in FIG. 14.

The dispensing areas (110, 112) in the present disclosure are categorized based on the frequency of products sold. In this case, the first dispensing area (110) contains dispensers for 'frequent' products (popular), while the second dispensing area (112) contains dispensers for 'infrequent' products (less popular). Furthermore, dispensers/subsystems (114, 122, 124) within the dispensing areas (110, 112) are placed in sequential order and storing products based on their popularity with the smart dispensing method; this will be explained further in FIG. 14.

Inside a dispensing area (110, 112), product dispensers are also arranged with the frequently-sold items at the start and the infrequently-sold items after that. A dispensing subsystem (114, 124) may contain one or more typical dispensing subsystems (114) and/or one or more grocery dispensing subsystems (124).

In another embodiment, there can be more than two dispensing areas (110, 112) integrated into the smart auto-vending system (100). In another embodiment, the dispensing areas (110, 112) can be categorized for storing products based on different attributes. Such examples of attributes include, but are not limited to: storage temperature, humidity, alphabetical order of names, product type, etc. Such categorization of dispensing areas may improve the storage of products, particularly perishable non-prepacked grocery products.

The preparation of the shipping box (104) is key in achieving several improvements. Thanks to the method for automated smart packaging, the AI determines the best box (104) size to store products pertaining to a customer's order: this is typically done based on the size of the order. A variety of boxes (104) of different sizes would be stored inside the box station (102) to be retrieved and prepared depending on the AI's evaluation of the order. This helps achieve reduced shipping costs, as the AI determines the cheapest box (104) size for storing a customer's order. The box (104) selection also plays a role in the automated smart shipping aspect, since the box (104) chosen would be one suited for automatic delivery via delivery drone or automated self-driving vehicle. As a result, shipping costs can be further reduced. Provided that an order is light enough for automatic delivery, the automated smart shipping aspect can provide improved efficiency, speed, and reliability for delivery without human beings.

The shipping box (104) is typically made of cardboard; however, the box (104) can be made of other materials in other embodiments. Examples of such materials include foam, metal, plastic, etc. However, it is possible that the box sterilization station (108) may need to use a different means of sterilization depending on the material.

A scannable code is placed on the shipping box (104) during its formation at the box station (102). Depending on the embodiment, this code can be a typical barcode, RFID tag, QR code, or any suitable means of relaying order information to the smart auto-vending system (100).

The postal service vehicle (120) is just one type of vehicle used for delivery. To achieve an automated method of smart shipping without personnel, a delivery drone or an autonomous self-driving car can be used to deliver a customer's order. As a result, the present disclosure achieves increased safety against germs and viruses, as well as the integrated benefit of lower costs and increased speed, efficiency, and reliability in relation to smart delivery without human beings. The method for automated smart shipping will be further shown and explained in FIG. 6 and FIG. 12.

Figure 2:
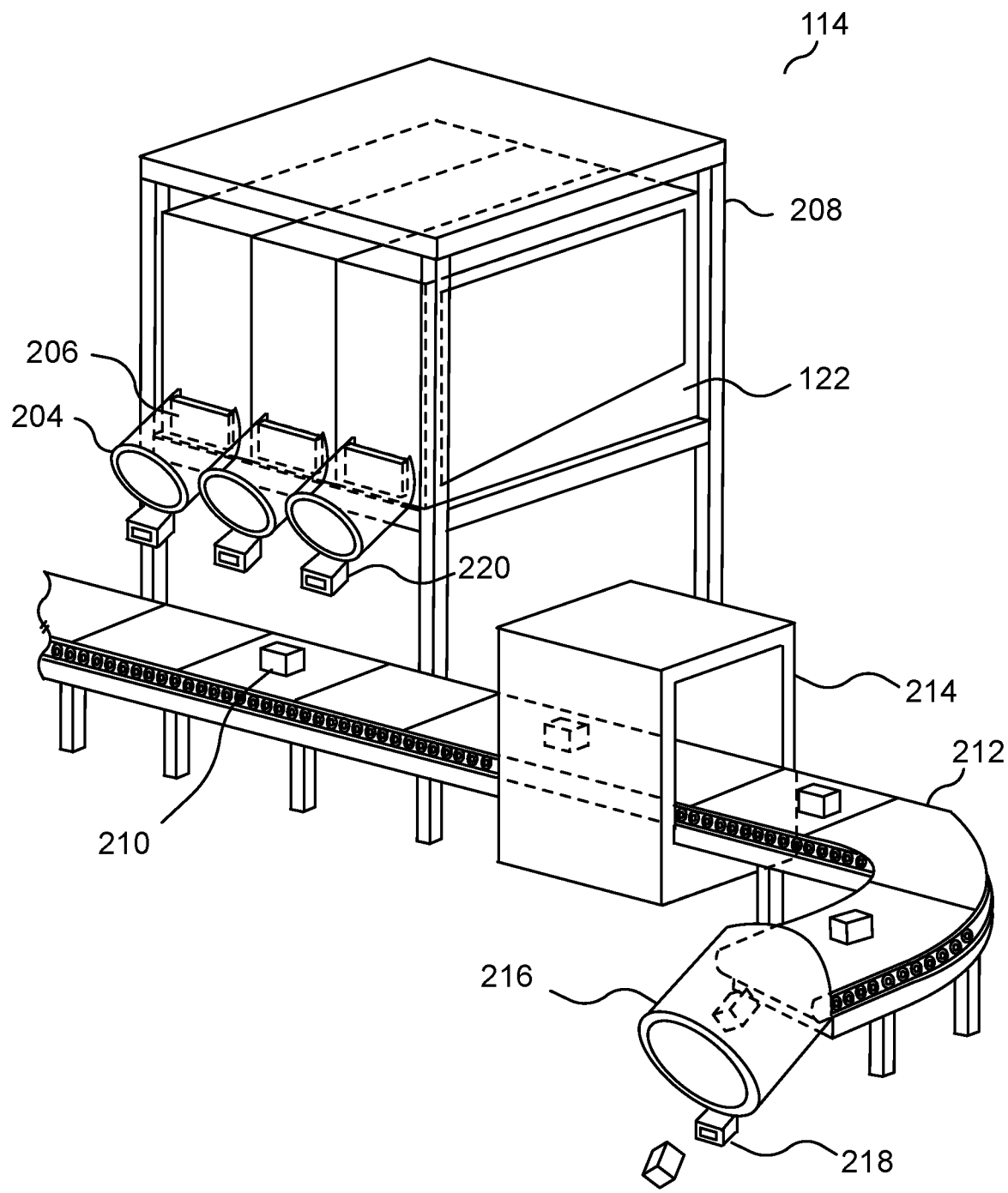
FIG. 2 illustrates a perspective view of a dispensing subsystem for prepacked products.

FIG. 2 illustrates a perspective view of a dispensing subsystem for prepacked products. Looking at the figure, the dispensing subsystem (114) starts on the left side of the figure and ends on the bottom right side of the figure. The dispensed products (210) travel toward the lower right side of the figure, where it loops and travels slightly to the lower left before being dispensed on the bottom right side of the figure. There is a subsystem chute (216) at the end of the dispensing subsystem (114) on the bottom right side of the figure, with its opening facing down toward the left. The subsystem chute (216) dispenses prepacked products (210) into the shipping box on the main conveyor. A subsystem sensor (218) is situated below the opening of the subsystem chute (216), which scans the shipping box to see if any of the prepacked products (210) are required in the order.

There are three dispensers (122) facing the left side of the figure, which are positioned side-by-side in a rack (208) structure above a subsystem conveyor (212) on the upper left side of the figure. An outward protruding dispenser chute (204) is welded on the bottom front side of each dispenser (122), which allows dispensed prepacked products (210) to slide down to the subsystem conveyor (212). The dispenser chute (204) of each dispenser (122) is facing down towards the subsystem conveyor (212). There is a small opening between each dispenser (122) and the top edge of each corresponding dispenser chute (204), which allows an associated dispenser gate (206) to open in order to dispense the required quantity of prepacked products (210). A dispenser sensor (220) is situated below the opening of each dispenser chute (220), which scans and confirms that the corresponding prepacked products (210) are part of the customer's order. The sensor (220) does this as the prepacked products (210) are sliding out of the dispenser chute (204).

The subsystem sensor (218) scans the code on a shipping box once. In a sequential order, each dispenser (122) dispenses a required quantity of a prepacked product (210). When the last dispenser (122) in the sequence dispenses their prepacked product (210) and when the correct quantity of products is confirmed, the subsystem conveyor (212) transports the dispensed prepacked products (210) to the subsystem sterilization station (214). Here, the AI determines the most optimal sterilization method for the dispensed prepacked products (210). The dispensed prepacked products (210) are sterilized and are transported along a looping curve on the subsystem conveyor (212). The dispensed prepacked products (210) are then dispensed into the shipping box via the subsystem chute (216).

The prepacked products (210) shown in this figure are rectangular in shape; however, it is obvious to those ordinarily skilled in the art that the prepacked products (210) can be any shape such as circular, triangular, irregular shapes, and etc. The size of the prepacked products (210) may also vary. It should also be noted that a typical dispensing subsystem (114) only holds prepacked items (210). However, the auto-vending system can also dispense, bag, and sterilize non-prepacked grocery products via a grocery dispensing subsystem; this will be further shown and explained in FIGS. 4 and 13. For the purpose of brevity, the term 'prepacked product' (210) may be used interchangeably with 'product' until the description of the grocery dispensing subsystem in FIG. 4.

The typical dispensing subsystem (114) incorporates multiple aspects in order to achieve improvements in the order fulfillment process. The dispensing subsystem (114) is designed in a way to achieve improvement in the order fulfillment process. On a broad level, the sections of the dispensing subsystem (114) are arranged in a streamlined order to get products (210) from the dispensers (122) to the shipping box on the main conveyor. Once dispensed, the products (210) are transported to the subsystem sterilization station (214) via the subsystem conveyor (212). Apart from the obvious benefit of increased safety against germs and viruses, the subsystem sterilization station (214) also increases the speed of order fulfillment, since the products (210) are already sterilized prior to entering the shipping box. As a result, the products (210) do not need to be taken out of the box for sterilization and put back into the box. Essentially, it saves time.

Speed in order fulfillment can also be achieved with the dispensing subsystem (114) thanks to the smart dispensing method. Products (210) are stored in dispensers (122) based on popularity, which can help streamline the process since items can along more quickly. This way, more popular products (210) can be dispensed at the beginning instead of waiting for sequential dispensers (122) within a dispensing subsystem (114) to dispense the product (210) that may be more popular. This aspect will be further explained in FIG. 14.

As noted before, the subsystem sterilization station (214) is key in increasing safety against germs and viruses. The subsystem sterilization station (214) is equipped with multiple methods for sterilization. More specifically, a method for automated smart sterilization is used by the system to determine which sterilization method is optimal for any dispensed product (210). The automated smart sterilization method will be further shown and explained in FIGS. 5 and 10.

Both the dispenser chute (204) and subsystem chute (216) are shown at predetermined lengths in the figure, but the chutes (204, 216) can be any length, depending on the embodiment. Preferably, the dispenser chute (204) and subsystem chute (216) may be longer in one alternative embodiment so that the impact of dispensing a product (210) onto the subsystem conveyor (212) and the shipping box, respectively, can be reduced. In another alternative embodiment, the subsystem chute (216) can be replaced with a robotic arm to retrieve products (210) at the end of the subsystem conveyor (212) to place products (210) inside the box. This can be helpful when a dispensed product (210) is fragile.

The sensors (218, 220) used within the standard dispensing subsystem (114) are typically cameras but can be any other information-capturing device depending on the embodiment. The subsystem sensor (218) reads the scannable code on the shipping box on the main conveyor and can be designed to read barcodes, RFID tags, QR codes, or any other scannable code, depending on the embodiment.

In case the wrong products (210) are dispensed onto the subsystem conveyor (212), an alarm can be implemented in one embodiment to notify the system of an error in dispensing. A way to retrieve products (210) that are not part of the order would be needed. In one such embodiment, a robotic arm can be placed on the opposite side of the dispensers (122) within the standard subsystem (114) to retrieve products (210) that were dispensed and not part of an order.

Three dispensers (122) are shown to be joined side-by-side, which are supported by a rack (208) structure. In one alternative embodiment, the number of dispensers (122) present may vary from one single dispenser (122) to a myriad of dispensers (122). In another alternative embodiment, the dispensers (122) can be spaced apart, regardless of whether they are part of a subsystem (114) or not. In yet another alternative embodiment, the dispensers (122) can be free-hanging from the ceiling.

Like with the main conveyor in FIG. 1, there are support legs below the subsystem conveyor (212) for support. In another embodiment, the subsystem conveyor (212) can be free-hanging, held up by support from the ceiling.

Figure 3:
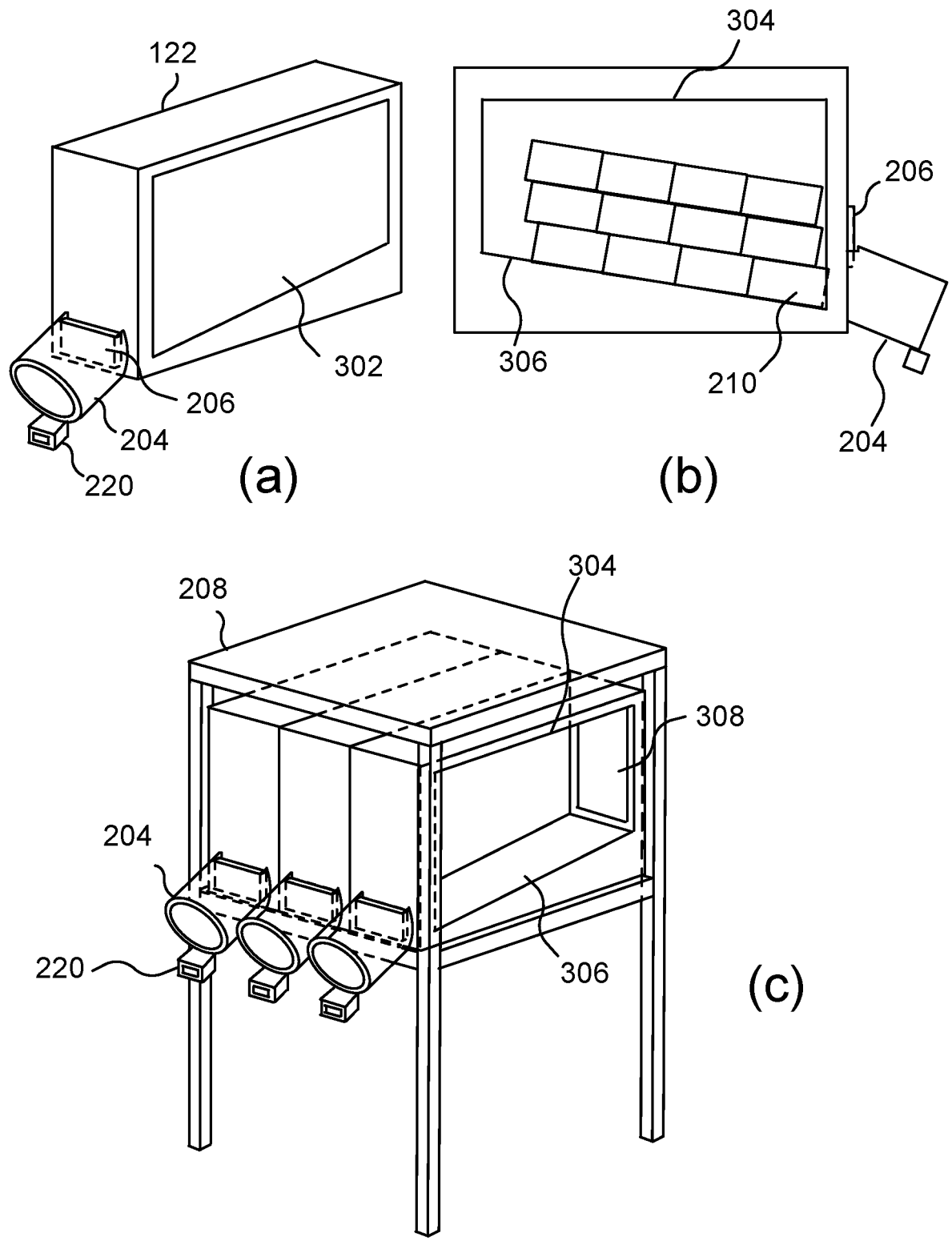
FIG. 3 illustrates perspective and side views of singular and multiple dispensers.

FIG. 3 illustrates perspective and side views of singular and multiple dispensers. Sub-figure (a) illustrates a perspective view of a single dispenser (122). The dispenser (122) is generally rectangular with elongated sides compared to the front and back sides. All descriptions of the dispenser (122) and its components in FIG. 2 also apply here—each dispenser (122) has a dispenser gate (206) at the bottom front side that opens to dispense products through the dispenser chute (204). A dispenser sensor (220) is located below the front opening of the dispenser chute (204). There is a side panel (302) on each elongated side of the dispenser (122).

Sub-figure (b) illustrates an open side view of the dispenser (122). The dispenser (122) is shown with the front side facing the right. From the viewpoint of the front side, the left side panel has been removed to reveal a side opening (304) on the left side of the dispenser (122), which shows the products (210) stacked on top of one another. A tilted interior base (306) inside the dispenser (122) allows the product (210) to slide out when the dispenser gate (206) is opened. The product (210) then slides out of the dispenser (122) via the dispenser chute (204).

The dispenser gate (206) automatically opens, moving upward when the product (210) is required. The dispenser gate (206) remains open for a period of time to dispense the required quantity of the product (210). Once the required quantity of products (210) has been dispensed through the dispenser chute (204), the dispenser gate (206) moves downward to close the dispenser and prevent additional products (210) from sliding out.

The products (210) shown in this sub-figure are prepacked and rectangular in shape like in FIG. 2. As a result, the products (210) are nicely stacked on top of one another. It is obvious to those skilled in the art that other products (210) of different shapes and sizes can be stored inside the dispenser (122). More importantly, such products (210) may be prepacked or non-prepacked.

On a related note, the dispenser opening, dispenser chute (204), and dispenser gate (206) can be modified in other embodiments to facilitate the dispensing of products (210) of various sizes. For example, larger products (210) may require a larger dispenser opening, which requires a larger dispenser chute (204) and dispenser gate (206).

The tilted interior base (306) is shown to be tilted up to a fixed angle to allow products (210) to dispense smoothly. The angle of the tilted interior base (306) can be tilted to a higher angle depending on the embodiment. This may cause products (210) to dispense faster, but it may lead to a higher quantity of products (210) being dispensed at one time. Furthermore, this may affect the amount of interior space inside the dispenser (122). On the contrary, a lower interior base (306) angle may give more interior space but may prevent products (210) from dispensing properly.

The dispenser gate (206) is shown externally on the front side of the dispenser (122). In an alternative embodiment, the gate (206) can be placed inside the dispenser (122); however, this may cause issues with the dispensing of products (210). In another embodiment, a hollow section can be made within the dispenser (122) wall on the front side so that the gate (206) can move up and down to dispense products accordingly.

Sub-figure (c) illustrates multiple dispensers (122) held on a rack (208). All general descriptions of the dispenser (122), its components, and the rack (208) in FIG. 2 also apply here. From a perspective viewing the front side, the dispenser on the right side is shown with a side opening (304) and rear opening (308) that provide access to the interior space of the dispenser (122). It is obvious to those skilled in the art that the rear opening (308) would be normally covered by a rear panel. The tilted interior base (306) is also shown on this dispenser (122).

Products (210) can be loaded into the dispenser (122) manually or with a robot depending on the embodiment. The latter case is beneficial for ensuring increased safety against germs or viruses due to the task falling to a robot. It may also save some time if the product can be loaded into the dispenser (122) by dumpling them in or in a way that allows for neater stacking on top of one another. For more fragile products, however, manual loading may be preferred.

Having openings at the sides (304) and at the rear (308) provide a way for products (212) to be loaded into dispensers (122). Having access to two openings (204, 208) is important if one dispenser (122) is situated between other dispensers (122) since the side openings (304) would then become inaccessible.

In another embodiment, there may be only one side panel (302) on either of the dispenser's (122) elongated sides. This makes the rear opening (308) essential for storing products (210). In another alternative embodiment, there are front and top dispenser openings. In the case of the former, however, the rack (308) may need to be removed, and the dispensers (122) would need to be supported in another way (e.g., free-hanging with support from the ceiling).

Figure 4:
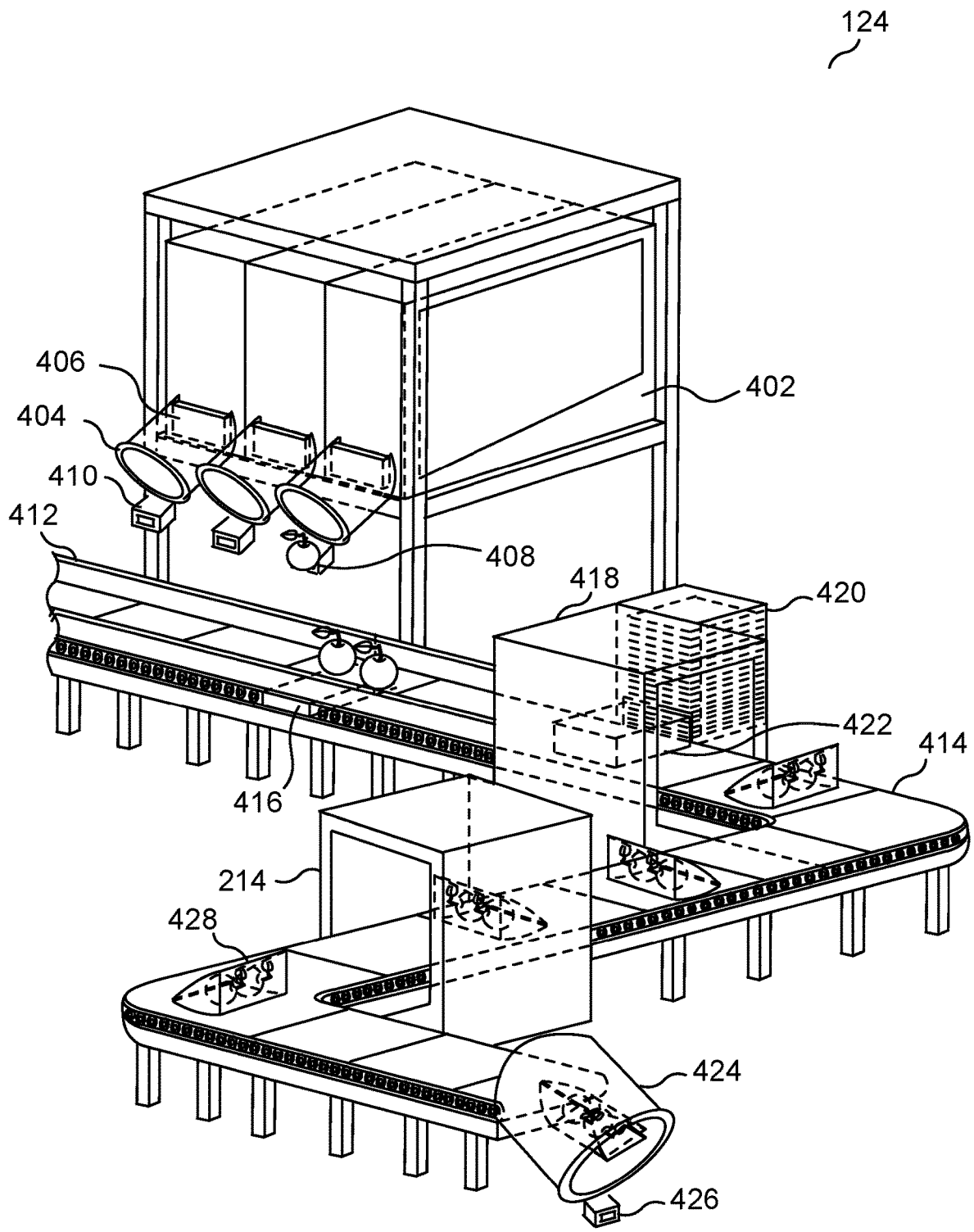
FIG. 4 illustrates a perspective view of a dispensing subsystem for non-prepacked products.

FIG. 4 illustrates a perspective view of a dispensing subsystem for non-prepacked grocery products. Such subsystem is also called grocery dispensing subsystem. Looking at the figure, the grocery dispensing subsystem (124) starts at the upper left side and ends at the bottom central part of the figure. Grocery products (408) on the grocery dispensing subsystem (124) loop around twice within the subsystem (124), which will be indicated in the description of this figure. There is a grocery subsystem chute (424) at the end of the grocery dispensing subsystem (124), with its opening facing down toward the right side. The grocery subsystem chute (424) dispenses non-prepacked grocery products (408) into the shipping box on the main conveyor. A grocery subsystem sensor (426) is situated below the opening of the grocery subsystem chute (424), which scans a shipping box to see if any of the non-prepacked grocery products (408) are required in the order.

There are three grocery dispensers (402) positioned side-by-side in a rack structure above a grocery subsystem conveyor (414) on the upper left side of the figure. An outward protruding grocery dispenser chute (404), facing down toward the left side of the figure, is welded on the bottom front side of each grocery dispenser (402), which allows dispensed non-prepacked grocery products (408) to slide down onto the subsystem conveyor (212). There is a small opening between each grocery dispenser (402) and the top edge of each corresponding grocery dispenser chute (404), which allows an associated grocery dispenser gate (406) to open in order to dispense the required quantity of non-prepacked grocery products (408). Guard rails (412) are installed at the edges of the grocery subsystem conveyor (414) to prevent grocery products (408) from falling off. A grocery dispenser sensor (410) is situated below the opening of each grocery dispenser chute (404), which scans and confirms the corresponding grocery products (408) as part of an order; this occurs as the grocery products (408) leave the grocery dispenser (402) via the grocery dispenser chute (404).

The grocery subsystem sensor (426) scans the code on a shipping box once. In a sequential order, each grocery dispenser (402) dispenses a required quantity of a grocery product (408). When the last grocery dispenser (402) in the sequence dispenses their grocery product (408), the grocery subsystem conveyor (414) transports the grocery products (408) to a grocery subsystem conveyor scale (416), where the grocery products (408) are weighed. The grocery subsystem conveyor (414) then transports the grocery products (408) to the right side toward the bagging station (418), where the grocery products (408) are bagged and sealed in at least one grocery bag (422). Hereinafter, a sealed grocery bag (422) with at least one grocery product (408) is referred to as 'grocery order' (428). The bagging station (418) has a bagging station storage compartment (420) that stores a plurality of stacked grocery bags (422). This storage compartment (420) dispenses and opens one grocery bag (422) at a time to store grocery products (408). When a grocery bag (422) is filled up with all the grocery products (408) in the order, the bagging station (418) seals the grocery bag (422) and a grocery order (428) is formed. If a customer's order is large and one bag (422) is filled to maximum capacity, the bagging station (420) then obtains and opens additional bags (422) to fit the rest of the dispensed grocery products (408).

Then, the grocery orders (428) travel on the grocery subsystem conveyor (414), looping around the grocery subsystem conveyor (414) to head toward the lower left side of the figure. Eventually, the grocery orders (428) come across the subsystem sterilization station (214). All descriptions of the subsystem sterilization station (214) in FIG. 2 also apply here. Once the grocery order orders (428) are sterilized, they travel on the grocery subsystem conveyor (414), looping around on the grocery subsystem conveyor (414) to head toward the lower right of the figure. At approximately the lower central part of the figure, the grocery orders (428) are dispensed through the grocery subsystem chute (424).

Although there are dedicated components in the dedicated grocery dispensing subsystem (124) (e.g., bagging station (418), bagging station storage compartment (420), the grocery subsystem conveyor scale (416)), the grocery dispensing subsystem (124) is fundamentally similar to a typical dispensing subsystem in FIG. 2. Both subsystems (114, 124) have dispensers, a conveyor, a subsystem sterilization station (214), a subsystem chute, and a subsystem sensor set up in relatively similar manners. In one embodiment, the guard rail (412) shown in this figure can also protect prepacked products on the subsystem conveyor in FIG. 2. Both subsystems (114, 124) have a method for automated smart sterilization. Both subsystems (114, 124) have their own integrated and streamlined workflow that fits within the main integrated, streamlined, and optimized workflow of the smart auto-vending system. As a result, the grocery subsystem (124) achieves the same improvements as a typical dispensing subsystem. There is increased safety against germs and viruses thanks to the automated smart sterilization aspect. Apart from the subsystem sterilization station (214), the grocery dispensing subsystem (124) also has automated bagging via its bagging station (418). As a result, no personnel touch the grocery products (408) or the grocery bags (422).

The grocery dispensing subsystem (124) is key in the system's ability to handle and dispense non-prepacked products. Individual grocery dispensers (402) that are not part of a grocery dispensing subsystem (124) can hold grocery products (408) in another embodiment; however, they are weighed, bagged, and sterilized prior to storage in the dispenser. These grocery products (408) would, therefore, be considered 'prepacked' as individual grocery orders (428).

The grocery dispensing subsystem (124) also contributes to increased speed in order fulfillment thanks to the streamlined order of the components in the grocery dispensing subsystem (124) and the optimal arrangement of non-prepacked products (408) for the grocery dispensers (402) within the grocery subsystem (124). Additionally, the separation of prepacked products and non-prepacked products (408) between the two subsystems (114, 124) makes item arrangement amongst dispensers easier and quicker since product arrangement within the subsystems is focused on either prepacked or non-packed products (408); this narrows the number of products each subsystem (114, 124) has to store.

The non-prepacked grocery product (408) in the figure is shown as a small to medium-sized fruit such as an apple or an orange. The grocery product (408) serves as an exemplary product that the grocery dispensers can store. Other embodiments may have grocery products (408) comprising of different shapes and sizes, such as a raisin or watermelon. Modifications to the grocery dispensers (402) and their associated components (404, 406, 410) may be required to accommodate such grocery products (408).

In another alternative embodiment, the grocery dispensers (402) may be modified to handle grocery products (408) based on their storage properties, such as temperature, humidity, etc. For example, the grocery dispensers (402) may have modified circuitry or components that allow for colder interiors, so that grocery products (408) like milk or meat can be stored inside without the risk of spoiling. In yet another alternative embodiment, unpackaged liquids can be stored inside the grocery dispensers (408); however, a container and a way to seal the container would be required in order to hold the liquid for dispensing. Furthermore, a means to mitigate spills from dispensing such liquids would be required.

Both the grocery dispenser chute (404) and dispensing subsystem chute (424) are shown at predetermined lengths in the figure, but the grocery chutes (404, 424) can be any length depending on the embodiment. Preferably, the grocery dispenser chute (404) and dispensing subsystem chute (424) may be longer in one alternative embodiment, so that the impact from dispensing a grocery product (408) onto the grocery subsystem conveyor (414) and a grocery order (428) into the shipping box can be reduced. In another alternative embodiment, the grocery subsystem chute (424) can be replaced with a robotic arm to retrieve grocery products (408) at the end of the grocery subsystem conveyor (414) to place grocery products (408) inside the box. This can be helpful when dispensed grocery products (408) and grocery orders (428) are fragile.

Figure 5:
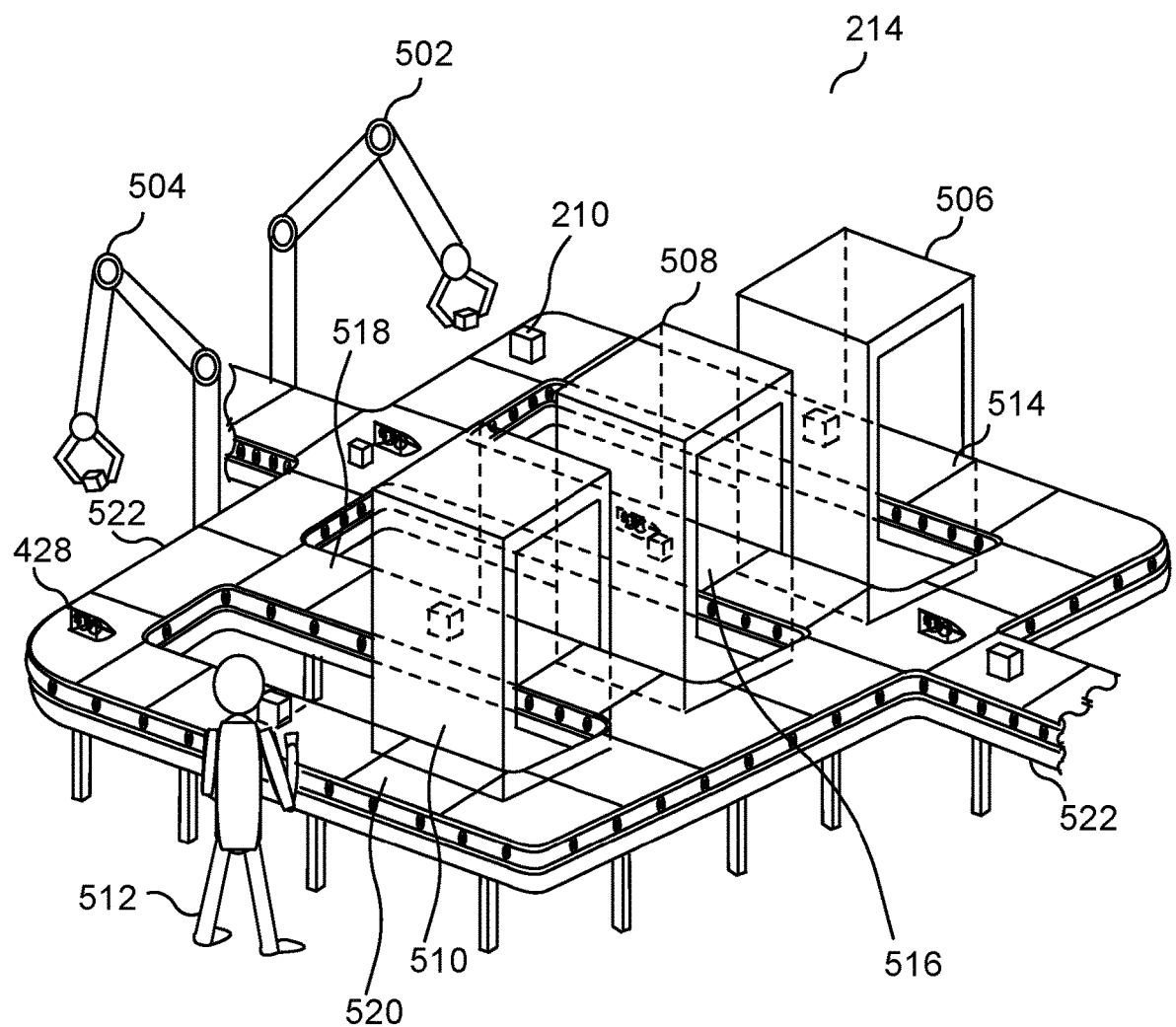
FIG. 5 illustrates a perspective view of a sterilization station subsystem.

FIG. 5 illustrates a perspective view of a sterilization station subsystem. Both prepacked products (210) and grocery orders (428) are shown together within the one subsystem sterilization station (214) since both subsystem types have identical subsystem sterilization stations (214). The subsystem sterilization station (214) starts from the upper left and ends at the lower right. Prepacked products (210) and grocery orders (428) move in a lower right direction along the station conveyor (522) and conveyor subsections (514, 516, 518, 520).

Both prepacked products (210) and grocery products (428) are transported on the conveyor section (522) at the upper left of the figure to a first sorting robot (502) and a second sorting robot (504). These sorting robots (502, 504) transport prepacked products (210) and grocery orders (428) to conveyor subsections (514, 516, 518, 520) leading to dedicated sterilization methods. The AI in the system examines the prepacked products (210) and grocery orders (428) to determine the most optimal sterilization method for the products (210) and grocery orders (428).

There are four sterilization methods contained within the subsystem sterilization station (214), each with its own conveyor sub-section (514, 516, 518, 520): a heat sterilization chamber (506) with a first conveyor sub-section (514) at the top right, a UV sterilization chamber (508) with a second conveyor sub-section (516) at the center-right, a chemical spray sterilization chamber (510) with a third conveyor sub-section (518) at the center-left, and a manual cleaning station with a manual sterilization worker (512) at the fourth conveyor sub-section (520) at the bottom left. The sorting robots (502, 504) grab each prepacked product (210) and grocery order (428) to be sent to the appropriate area within the station (214) for sterilization: the first sorting robot (502) grabs and transports prepacked products (210) and grocery orders (428) and puts them on the first (514) and second (516) conveyor sub-sections leading to the heat (506) and the UV (508) sterilization chamber respectively.; the second sorting robot (504) grabs and transports prepacked products (210) and grocery orders (428) to the third (518) and fourth (520) conveyor sub-sections leading to the spray sterilization chamber (510) and the manual sterilization worker (512) respectively.

The prepacked products (210) and grocery orders (428) go through the appropriate sterilization chamber (506, 508, 510) or are manually cleaned by the manual sterilization worker (512) if no other method is suitable. All prepacked products (210) and grocery orders (428) are eventually transported from their respective conveyor sub-sections (514, 516, 518, 520) to the station conveyor (522) at the bottom right, where they will eventually be dispensed into the shipping box.

The method of automated smart sterilization contributes to many improvements, the most obvious of which is increased safety against germs and viruses. The manual sterilization worker (512) is beneficial because some products may require dexterity to clean or have several concealed surfaces that the chambers (506, 508, 510) cannot sterilize. Furthermore, only one manual sterilization worker (512) is needed per subsystem, so labor costs can also be reduced.

The chambers (506, 508, 510) can operate with preset or variable settings depending on the embodiment: the heat sterilization chamber (506) may have a preset or variable temperature; the UV sterilization chamber (508) may have a preset or variable wavelength; the chemical spray sterilization chamber (510) may have a preset or variable amount sprayed. Additionally, the chemical spray sterilization chamber (510) may have various cleaning liquids (e.g., rubbing alcohol) at various concentrations depending on the embodiment.

In one alternative embodiment, additional sterilization methods may be used such as steam. This would further contribute to increased safety against germs and viruses.

The subsystem sterilization station (214) integrates the multiple methods of smart sterilization into a streamlined fashion. Although the sorting robots (502, 504) are required to move prepacked products (210) and grocery orders (428) to the conveyor subsections (514, 516, 518, 520) leading to the appropriate sterilization methods (506, 508, 510, 512), the sterilization process itself moves prepacked products (210) and grocery orders (428) forward without the need to backtrack or be removed from the auto-vending system for handling. The first, second, and third conveyor subsections (514, 516, 518) just move most prepacked products (210) and grocery orders (428) through the UV light, heat, or spray sterilization chambers (506, 508, 510). In a sense, the automated method for smart sterilization contributes to the speed of the order fulfillment process.

This information regarding the best sterilization method for each product is stored in a system database, which the AI evaluates when a prepacked product (210) or grocery order (428) is brought for sterilization. This evaluation is presumably done via a camera on both sorting robots (502, 504).

The sorting robots (502, 504) take the form of robotic arms in the preferred embodiment of the present disclosure. In one alternative embodiment, a different machine (e.g., lift or remotely controlled robots) may be used to transport prepacked products (210) and grocery orders (428) to their appropriate sterilization method. In another embodiment, individual sections of the subsystem conveyor (212) can move prepacked products (210) and grocery orders (428) to the conveyor subsections (514, 516, 518, 520) leading to the appropriate sterilization methods (506, 508, 510, 512).

Figure 6:
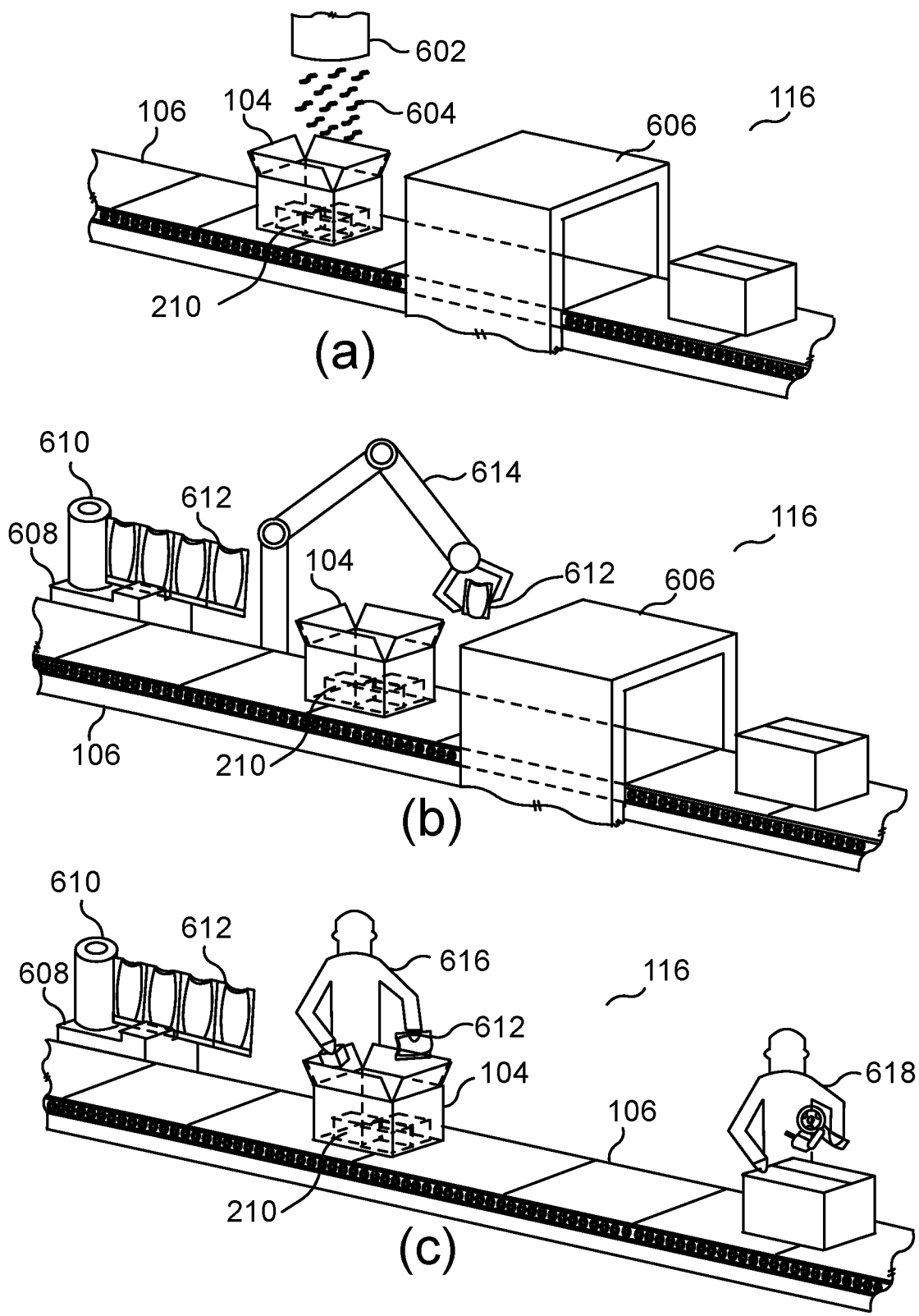
FIG. 6 illustrates perspective views of preferred and alternative embodiments of the packaging area.

FIG. 6 illustrates perspective views of preferred and alternative embodiments of the packaging area. Sub-figure (a) illustrates a preferred embodiment of the packaging station (116). The shipping box (104) starts at the upper left side of the packaging station (116) and moves down to the lower right side of the packaging station (116) via the main conveyor (106). The box (104) is packed with the customer's order, which contains prepacked products (210) in this sub-figure. The box (104) is transported and situated underneath a loose filler dispenser (602). Packaging material or filler, in the form of packing peanuts (604), is dispensed from the loose filler dispenser (602) to fill up the remaining empty spaces inside the shipping box (104). The box (104) is taken to a box packaging station (606) to be sealed and tagged. At this point, the box packaging station (606) also indicates to the system that an order has been fulfilled before moving along the main conveyor (104) to the shipping station.

For the purpose of brevity, the box packaging station (606) is shown as a simplified abstraction of a chamber that is responsible for the sealing and tagging of the shipping box (104), as well as the acknowledgment to the system that the order has been fulfilled and ready for delivery. The packaging station (116) and associated box packaging station (704) would presumably have their own processors and implementations for communicating with the AI.

It should be noted that the shipping box (104) in this figure shows only prepacked products (210) as an example of what a customer's order may contain. It is obvious to those skilled in the art that the customer's order may also contain grocery orders of non-prepacked products. The term 'prepacked product' (210) may be simply referred to as 'product' for the remainder of FIG. 6's description.

This automated method of the packaging station (116) means that no people are required, so there is increased protection against germs and viruses. The packaging station (116) in this sub-figure also increases speed and efficiency in order fulfillment since the shipping box (104) just travels on the main conveyor (106) to the loose filler dispenser that automatically drops packing peanuts (604) into the box (104) until it is filled. Those skilled in the apart will find it obvious that there would be a sensor on the loose filler dispenser (602) that examines the box (104) to see how much material is required. This would prevent any wastage in packing peanuts (604) or any other filler material, reducing costs in packaging supplies. In any case, no dexterous handling of products (210) or packing peanuts (604) is required. However, other embodiments may implement such handling as a way to optimally arrange products (210); this will be shown in future sub-figures.

In another alternative embodiment, another loose packaging material like wood wool may be dispensed from the loose filler dispenser (602) to fill the gaps in the shipping box (104).

Sub-figure (b) illustrates a first alternative embodiment of the packaging station (116). All descriptions of the shipping box (104), its movement on the main conveyor (106), prepacked products (210), and box packaging station (606) in the previous sub-figure also apply here. The box (104) moves on the main conveyor (106), where it momentarily stops next to a packaging robot (614). If the rearrangement is configured by the system, the packaging robot (614) optimal arranges prepacked products (210) inside the box (104), provided that rearrangement is configured by the smart auto-vending system. Air cushions (612) are formed from a sheet of air cushion film roll (610) going through an air cushion machine (608); this process is shown on the upper left side of the packaging station (116). The packaging robot (614) takes an individual air cushion (612) and fits it inside the remaining spaces of the box (104); it does this until the box (104) is optimally filled. The box (104) then goes through the box packaging station (606) to be sealed and tagged. The box (104) leaves the box packaging station (606) to be transported to the shipping station; the order is considered fulfilled.

The alternative embodiment of the packaging station (116) in this sub-figure exemplifies the increased safety against germs and viruses due to the lack of personnel. While packaging (and order fulfillment as a whole) may be slightly slower compared to sub-figure (a), there is more protection for the products (210) from the air cushions (612). Additionally, the system's AI can determine the most optimal rearrangement of products (210) in the shipping box (104). The AI does this after examining the interior of the box (104) via a sensor, presumably on the packaging robot (614). As a result of optimal rearrangement, more air cushions (612) can be placed inside to provide increased protection.

In one embodiment, the packaging robot (614) is instructed by the AI to rearrange products (210) so that they take up the least amount of room in the shipping box (104). In other words, the products (210) would be rearranged based on size and positioning. In an alternative embodiment, the packaging robot (614) is instructed by the AI to rearrange products (210) by a different parameter, such as weight, fragility, etc. This is important if there are grocery orders in the box (104). For example, the AI instructs the packaging robot (614) to place a grocery order with eggs at the top.

Sub-figure (c) illustrates a second alternative embodiment of the packaging station (116), where the packaging robot (614) and the box packaging station (606) are replaced with two packaging workers (616, 618). All descriptions of the shipping box (104), its movement on the main conveyor (106), and prepacked products (210) in the previous sub-figures also apply here. The box (104) moves on the main conveyor (106), where it momentarily stops next to a first packaging worker (616). The first packaging worker (616) rearranges the products (210) inside the box (104) and places air cushions (612) inside to secure the order. All descriptions of the air cushions (612), air cushion machine (608), and air cushion film roll (610) in the previous sub-figure also apply here. The box (104) then moves along the main conveyor (106) to a second packaging person (618), where it is sealed and tagged. The box (104) is then sent to the shipping area.

Although packaging personnel (616, 618) are required in this sub-figure, one major advantage is that the packaging personnel (616, 618) can intuitively determine how products (210) should be stacked in a shipping box (104). The packaging personnel (616, 618) can also handle delicate products (210) better than a machine, and can quickly determine how packaging material (i.e., air cushions (612)) should be placed inside the box (104) for optimal protection. In another sense, the packaging personnel (616, 618) serve as a form of quality assurance to improve order fulfillment.

The second packaging worker (618) is shown to seal the shipping box (104) by taping the top. It is obvious to those skilled in the art that the second packaging worker (618) may use shrink wrap in another embodiment to further seal and secure the box (104).

The air cushions (612) in sub-figures (b) and (c) are just one example of packaging material that can be used to cushion products (210) in the shipping box (104). Such an option is possible because the packaging robot (614) and the first packaging worker (614) have the required dexterity to securely place the air cushions (612) inside. However, other packaging material may be used in other embodiments, including corrugated paper, bubble wrap, foam sheets, or even loose packaging material (e.g., packing peanuts).

The packaging station (116) in this figure contributes to lower various costs associated with order fulfillment. Sub-figures (a) and (b) do not require personnel to handle packaging, reducing or even eliminating labor costs. The box (104) selected earlier in order fulfillment also contributes to reducing costs at the packaging station (116). The size of the box (104) is determined by the AI to fit the products (210) of an order in the smallest box size possible, which reduces shipping costs. The AI also examines the box (104) via a sensor to use up just enough packaging material (i.e., packing peanuts (604) and air cushions (612)) for securing products (210) in the box (104); this helps reduce costs of supplies since less packaging material is used per order.

Figure 7:
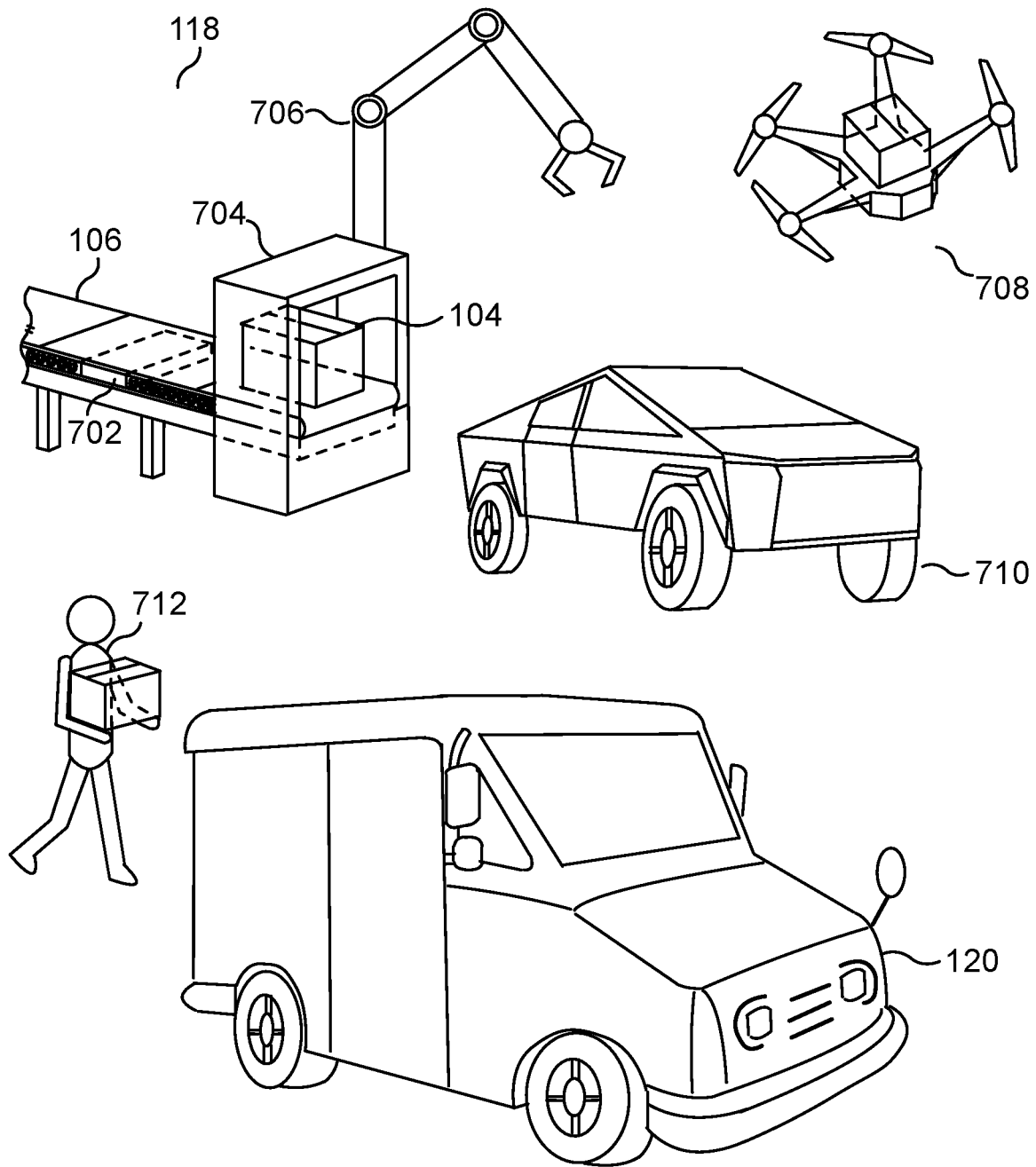
FIG. 7 illustrates a perspective view of the shipping station subsystem.

FIG. 7 illustrates a perspective view of the shipping station subsystem. The sealed shipping box (104) travels on the main conveyor (106) to a shipping area conveyor scale (702), where it is weighed. The box (104) then moves to the delivery station (704). Here, the box (104) is scanned and potentially given a second tag. After scanning, the AI then determines an itinerary for the fastest and shortest delivery route for getting the box (104) to the customer. Based on various criteria and evaluation of the order by the AI, a shipping robot (706) next to the delivery station (704) retrieves the box (104) and places it on top of a delivery drone (708) or inside an autonomous self-driving vehicle (710) on the right side of the figure. Alternatively, a delivery person (712) may retrieve the box (104) from the delivery station (704), place it inside a postal service vehicle (120) at the bottom of the figure. The delivery person (712) would then deliver the box (104) to the post office for processing and eventually to the customer.

For the purpose of brevity, the delivery station (704) is shown as an abstract representation for scanning and possibly placing additional tags on the box (104). The shipping station (118) and the associated delivery station (704) would presumably have their own processors and implementations for communicating with the AI to determine the optimal itinerary for order delivery.

The shipping station (118) contributes to some of the improvements attributed to the present disclosure: there is improved efficiency, lower costs, increased speed, and reliability for smart delivery without human beings. The shipping station (118) is set up as part of the smart auto-vending system's streamlined, integrated, and optimized workflow, which helps speed up order fulfillment. The AI takes minimal time to determine the shortest and fastest route to a customer's location, further speeding up the order fulfillment process and reducing shipping costs. Most orders are delivered by either a delivery drone (708) or an autonomous self-driving vehicle (710). Because people are seldomly involved, there is increased safety against germs and viruses.

It is obvious to those skilled in the art that the delivery vehicles (708, 710) are designed for traveling in bad weather conditions like rain or snow (e.g., waterproofing, appropriate tires, etc.) As a result, the weather does not affect the speed of order fulfillment.

It is also obvious to those skilled in the art that both the delivery drone (708) and autonomous self-driving vehicle (710) are equipped with a GPS to follow the route outlined in the generated itinerary. The autonomous delivery vehicles (708, 710) are presumably equipped with a sensor like a camera to track their surroundings. In one alternative embodiment, the delivery drone (708) and autonomous self-driving vehicle (710) can adjust the itinerary during delivery in order to avoid sudden obstacles (e.g., traffic, collisions, etc.).

The AI determines the delivery itinerary and means of delivery based on various parameters, including the distance, the weight of the box (104), and bylaws regarding delivery drones (708). This will be further shown in FIG. 12.

The delivery person (712) manually picks up the box (104) to place inside the postal service vehicle (120) in this figure. In an alternative embodiment, a robot can place the box (120) in the postal service vehicle (120). This would help further contribute to increased safety against viruses and germs since the delivery person (712) does not handle the box (104), likely just remaining near the postal service vehicle (120) to facilitate this robot before driving off with the box (104).

The autonomous self-driving vehicle (710) is shown as a Tesla truck in the figure, but it can be any model depending on the embodiment, including smaller autonomous rover-like vehicles.

The shipping robot (706) loading a box onto a delivery drone (708) is one example of how the box is secured on the drone. In an alternative embodiment, the delivery drone (708) can hover to the delivery station (704) to retrieve the box (104) by grabbing it from underneath.

Figure 8:
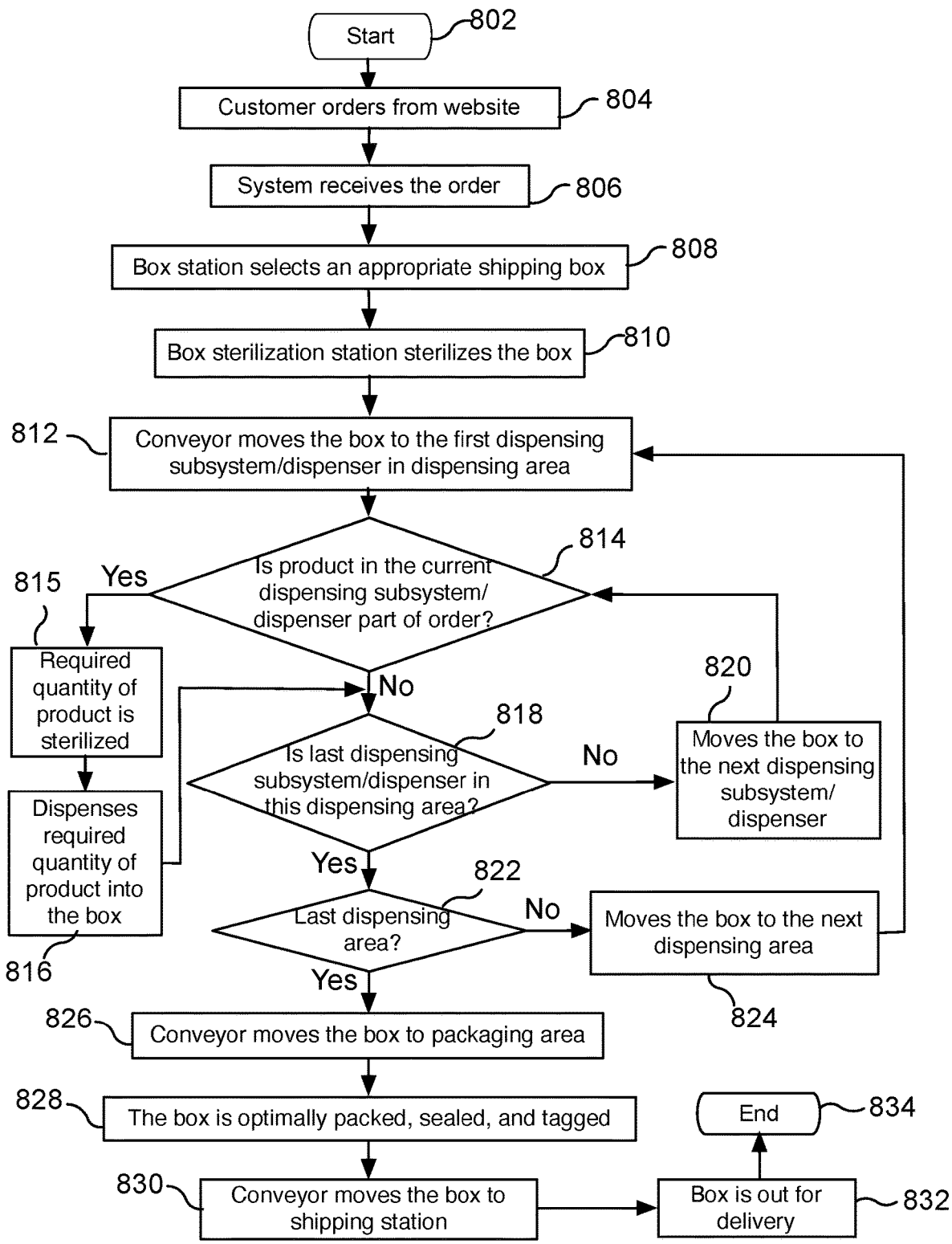
FIG. 8 illustrates a flow diagram outlining the general process of the smart auto-vending system according to the embodiment shown in FIG. 1.

FIG. 8 illustrates a flow diagram outlining the general process of the smart auto-vending system according to the embodiment shown in FIG. 1. The process starts (802), and customer orders their requested products from a store's website at step (804). The system receives the order at step (806). At step (808), the box station selects an appropriate shipping box for the customer's order. The box sterilization station then sterilizes the box at step (810). At step (812), the conveyor moves the box to the first dispensing subsystem/dispenser in the first dispensing area. At step (814), the AI determines if the product in the current dispensing subsystem/dispenser is part of the customer's order. If it is, then the required quantity of the product is sterilized at step (815). This step is achieved by default in the case of individual dispensers. The products are then dispensed into the box at step (816). The system then needs to determine if the current dispensing subsystem/dispenser is the last one in the dispensing area at step (818).

If the product in the current dispensing subsystem/dispenser is not part of the order at step (814), the process skips to step (818) to determine if the current dispensing subsystem/dispenser is the last one in the dispensing area. If it is not, then at step (820), the box moves to the next dispensing subsystem/dispenser to repeat step (814). If it is the last dispensing subsystem/dispenser in the dispensing area, the system now needs to determine if the box is in the last dispensing area at step (822). If it is not, then the system moves the box to the next dispensing area at step (824). The process then moves back to step (812). If it is, then the conveyor moves the box to the packaging station at step (826). The box is optimally packed, sealed, and tagged at step (828). The conveyor moves the box to the shipping station (830). At step (832), the box is sent out for delivery, and the process ends (834).

The customer may use any type of input device that allows them to order their products online. Depending on the embodiment, this may include a desktop computer with keyboard and mouse input, a smartphone, a tablet, etc.

Products dispensed from individual dispensers rather than dispensing subsystems have already been sterilized prior to storage inside the dispenser. In this case, no sterilization station is involved. However, step (815) can still apply because it is a state of the products in the process rather than an action. In other words, step (815) is where products are in a 'sterilized state' regardless of the method involved. In one alternative embodiment, where individual dispensers are present in the dispensing areas, the required products can be sterilized inside the dispensers at step (815) before they are dispensed. However, modifications to the dispensers' structure may be required.

Figure 9:
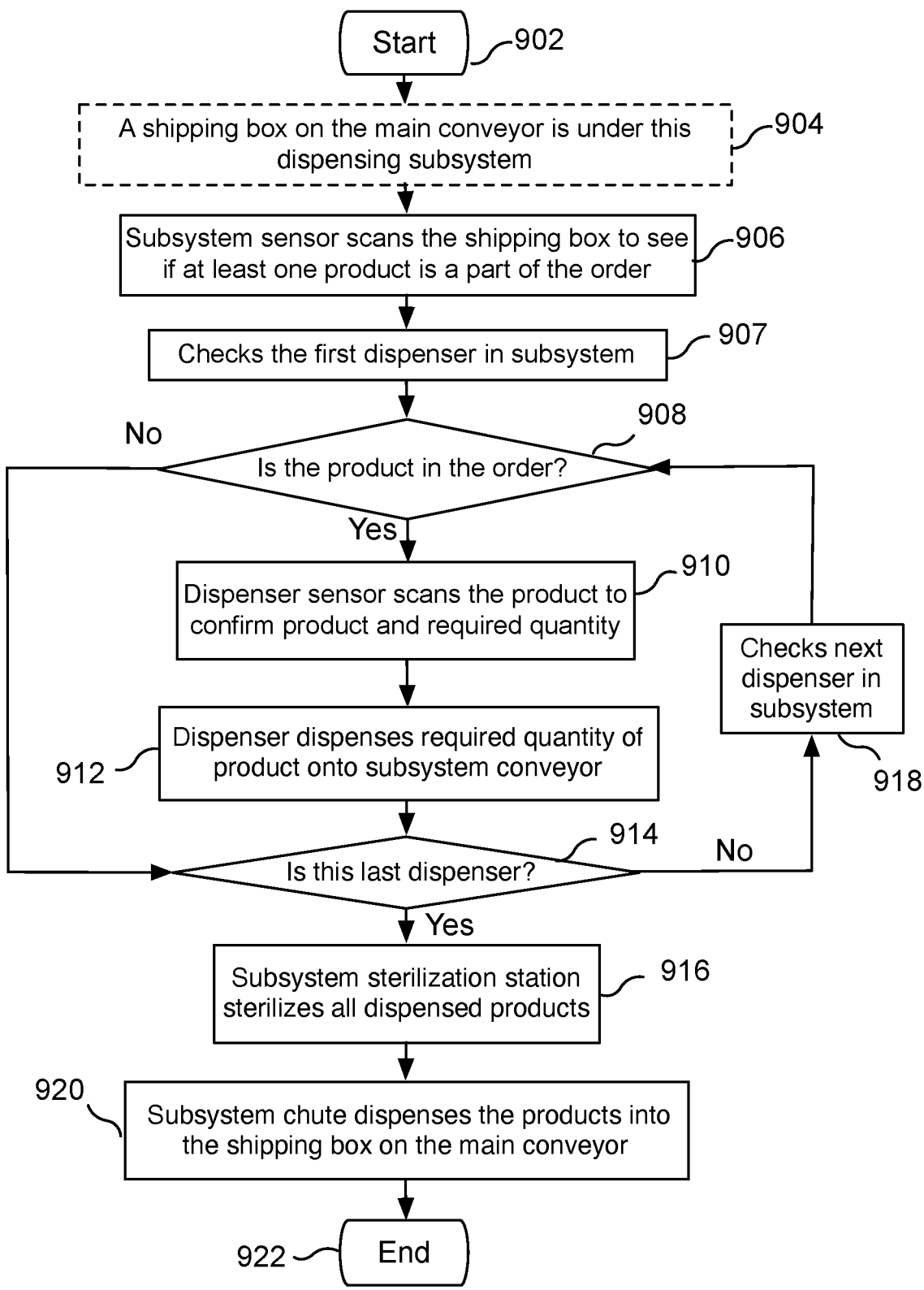
FIG. 9 illustrates a flow diagram outlining the process of dispensing products in a dispensing subsystem according to the embodiment shown in FIG. 2.

FIG. 9 illustrates a flow diagram outlining the process of dispensing products in a dispensing subsystem according to the embodiment shown in FIG. 2. The process starts (902). A shipping box on the main conveyor goes under a dispensing subsystem at step (904). At step (906), a subsystem sensor scans the shipping box to see if at least one product is part of the order. The AI in the system checks the first dispenser in the subsystem at step (907). At step (908), the AI then determines if the product is in the customer's order. If it is, the dispenser sensors scan the product to confirm that the product type and required quantity are included in the order at step (910). The dispenser then dispenses the required quantity of the product onto the subsystem conveyor at step (912). At step (914), the AI determines if this is the last dispenser. Step (914) is also a result of no product in the order at step (908). If there are additional dispensers at step (914), the next dispenser in the subsystem is checked at step (918), and the process repeats again from step (908). If the current dispenser is considered the last in the subsystem, then the subsystem sterilization station sterilizes all dispensed products at step (916). The subsystem chute dispenses the products into the shipping box on the main conveyor belt at step (920), and the process ends (922).

A dashed outline is shown at step (904) because it relates to the shipping box outside the dispensing subsystem. Furthermore, step (904) is not reflected in FIG. 2, although it is required before the process for the dispensing subsystem begins. In other words, the box's state is not part of the subsystem process itself, yet it is needed for the process to start.

Figure 10:
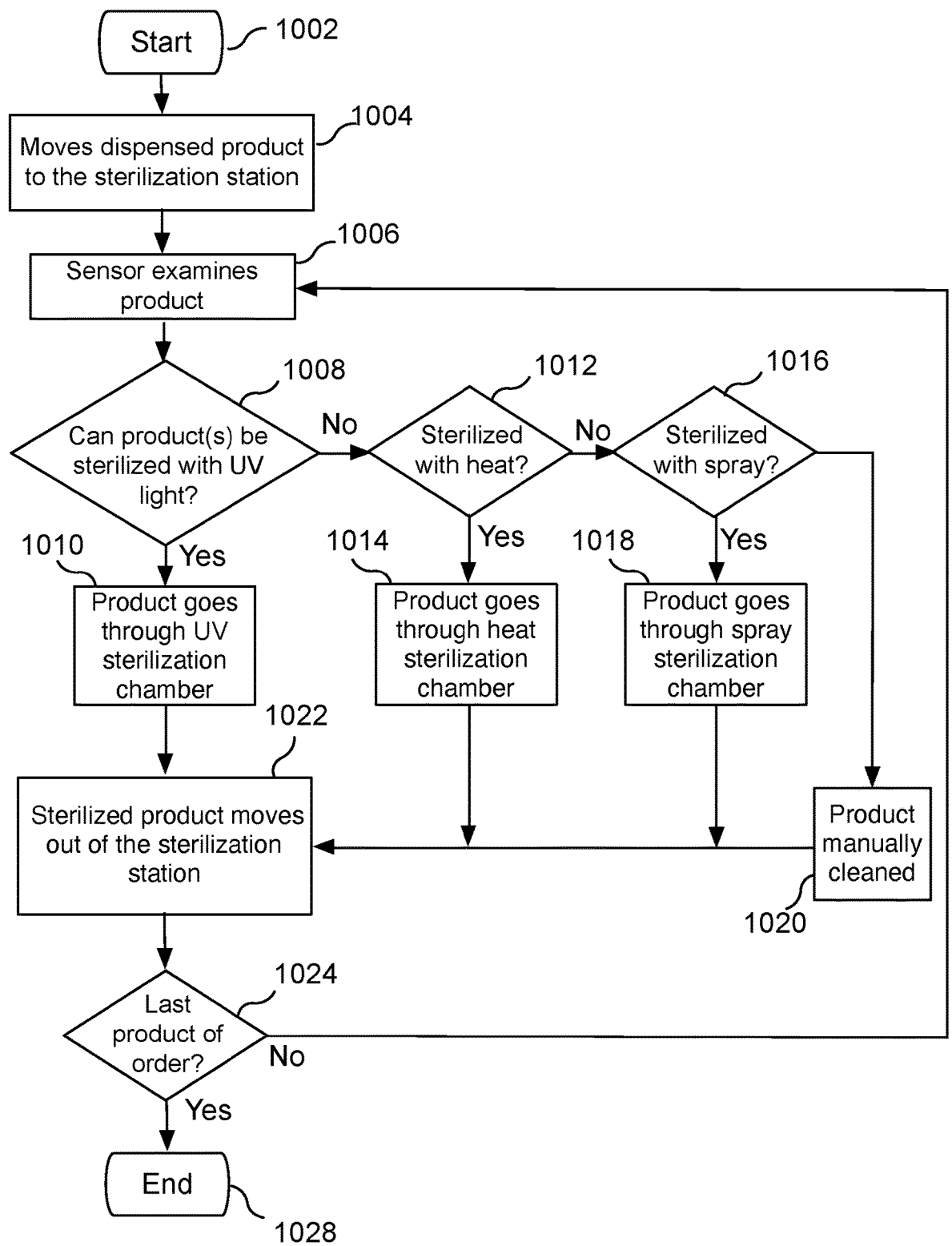
FIG. 10 illustrates a flow diagram outlining the process of sterilizing products at a subsystem sterilization station within a dispensing subsystem according to the embodiment shown in FIG. 5.

FIG. 10 illustrates a flow diagram outlining the process of sterilizing products at a subsystem sterilization station within a dispensing subsystem according to the embodiment shown in FIG. 5. The process starts (1002). The dispensed products of an order are moved to the sterilization station at step (1004). The sensor examines one product at step (1006). At step (1008), the system's AI determines if the examined product can be sterilized with UV light (1008). If it can, the product goes through the UV sterilization chamber at step (1010). If they cannot, the process goes to step (1012), where the AI determines if the products can be sterilized with heat. If it can, the product goes through the heat sterilization chamber at step (1014). If not, the AI then determines if the product can be sterilized with a chemical spray at step (1016). If it can, the product goes through the spray sterilization chamber at step (1018). If not, the product is moved to the manual cleaning station to be manually sterilized at step (1020). After the product is sterilized at steps (1010), (1014), (1018), or (1020), it is moved out of the sterilization station at step (1022). At step (1024), the AI determines if the sterilized product is the last product of the order. If it is not, the process is repeated from step (1006) for the next product. Otherwise, the process ends (1028).

Information regarding the most optimal sterilization method is stored in a system database, which the AI evaluates and assigns the products to their respective sterilization method at steps (1010), (1014), (1018), or (1020).

Figure 11:
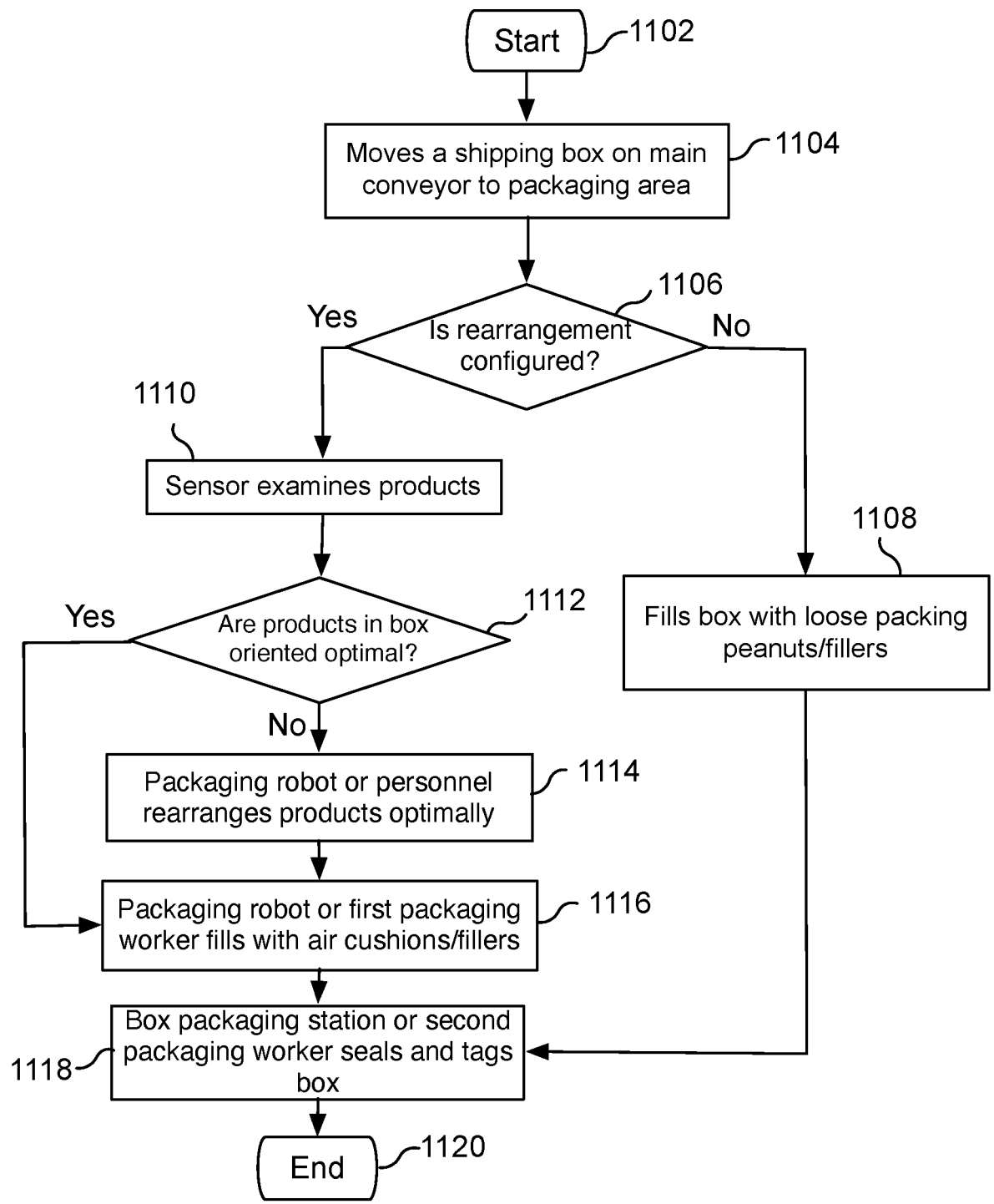
FIG. 11 illustrates a flow diagram outlining the process of packaging an order in the packaging station according to the embodiment shown in FIG. 6.

FIG. 11 illustrates a flow diagram outlining the process of packaging an order in the packaging station according to the embodiment shown in FIG. 6. The process starts (1102). The system moves a shipping box on the main conveyor to the packaging area (1104). At step (1106), the Ai in the system determines if rearrangement is configured. If not, a loose filler dispenser fills the box with packing peanuts or any other fillers at step (1108). A sensor is presumably used to check the box in order to determine how much packaging material is needed to completely fill the box.

If rearrangement is configured in step (1106), a sensor then examines the products inside the box at step (1110). The AI determines if the products in the box are optimally oriented at step (1112). If they are not, a packaging robot or first packaging worker optimally arranges the products at step (1114). The packaging robot or first packaging worker fills the box with air cushions or fillers at step (1116); this step is also directly reached if the AI determines if the products in the box are optimally oriented at step (1112). At step (1118), the box is sent to the box packaging station or second packaging worker, where it is sealed and tagged. Step (1118) is also reached after a box is filled with loose packing peanuts at step (1108), provided that rearrangement was not configured in step (1106). The process then ends (1120).

Figure 12:
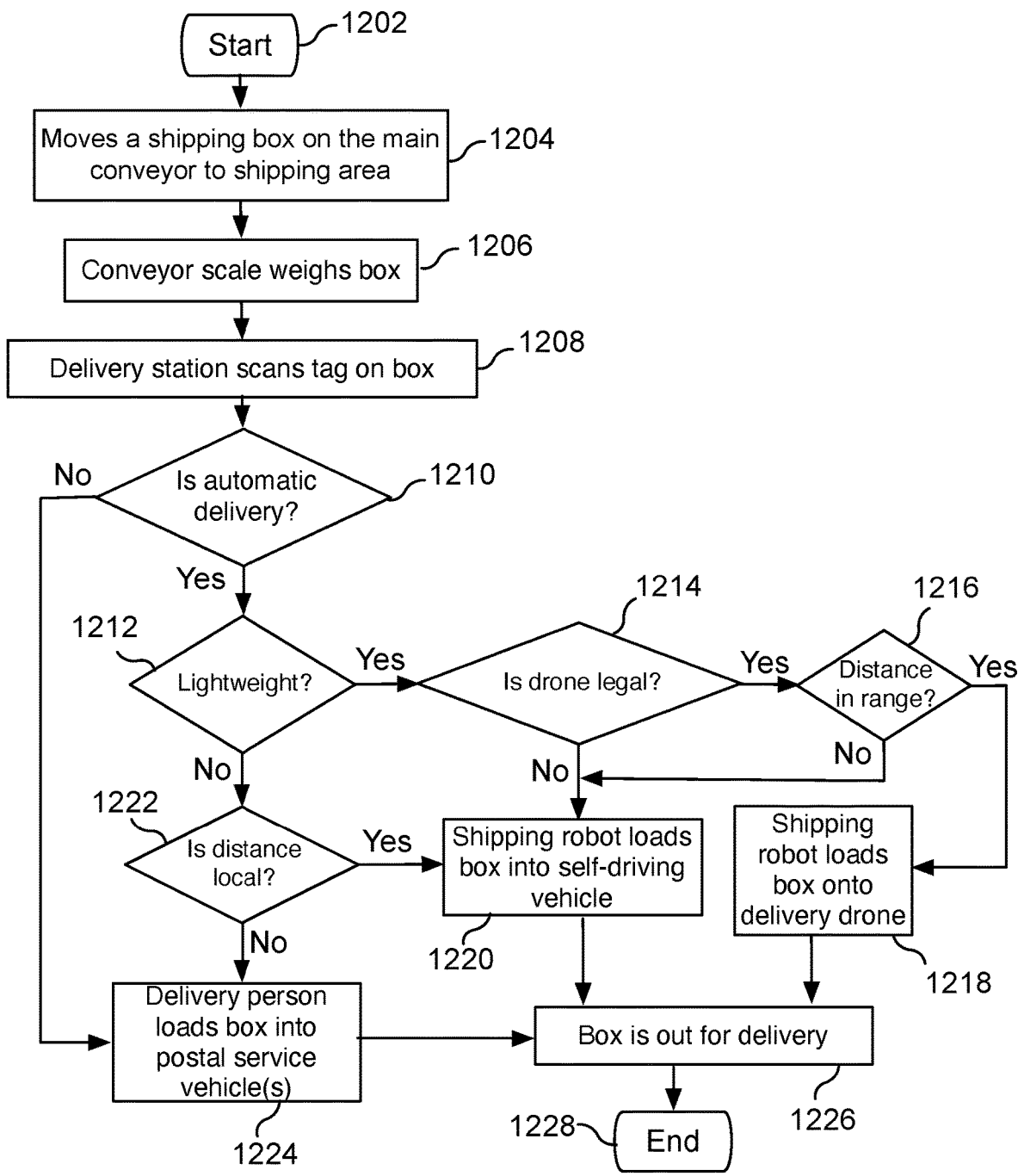
FIG. 12 illustrates a flow diagram outlining the process of shipping an order from the shipping station according to the embodiment shown in FIG. 7.

FIG. 12 illustrates a flow diagram outlining the process of shipping an order from the shipping station according to the embodiment shown in FIG. 7. The process starts (1202). The system moves the shipping box on the main conveyor to the shipping station at step (1204). The box moves to a conveyor scale at step (1206), where it is weighed. The box then moves to the delivery station, where the initial tag on the box is scanned at step (1208). The system then determines if automatic delivery is required at step (1210). If it is not, then a delivery person loads the box into at least one postal service vehicle at step (1224).

If automatic delivery is required at step (1210), then the AI has to determine if the box is lightweight at step (1212). If it is not, then the AI has to determine if the delivery distance is in a local area at step (1222). If it is not, then a delivery person loads the box into at least one postal service vehicle at step (1224). If it is, then a shipping robot loads the box into a self-driving vehicle at step (1220).

If the box is considered lightweight at step (1212), however, then the AI needs to find out if drones are legal in the area of delivery at step (1214). If they are not, then a shipping robot loads the box into a self-driving vehicle at step (1220). If they are, then at step (1216), the AI determines if the distance is within range for a drone to deliver the box. If yes, then a shipping robot loads the box onto a delivery drone at step (1218). If not, then a shipping robot loads the box into a self-driving vehicle at step (1220).

From either step (1216), (1220), or (1224), the box is loaded into the delivery vehicle in step, which is then sent out for delivery at step (1226). The process then ends (1228).

The means of delivery (i.e., drone, self-driving vehicle, postal service vehicle) is determined by the itinerary generated by the AI of the smart auto-vending system. This contributes to faster and cheaper order fulfillment, particularly with smart delivery without human beings. The AI takes information from various stations and areas. Those skilled in the art will find it obvious that the generated itinerary also takes other orders into consideration. This is particularly true for delivery by self-driving or postal vehicles at steps (1220) and (1224) respectively. So, a self-driving vehicle may end up delivering multiple orders that are located close together within the same city.

Weight is one key parameter for the AI to determine the most optimal method for shipping. The weight obtained from the shipping area conveyor scale is what is used to determine the itinerary and delivery method. The term 'lightweight' in step (1212) refers to any weight that a delivery drone can carry, which may vary, but can be reasonably assumed to be less than five pounds. Other embodiments may use delivery drones that can carry heavier boxes (e.g., 20 pounds), but those are more expensive and would not be frequently used enough to justify the costs.

Distance is also a key parameter for the AI to determine the most optimal method for automated smart shipping. This information is obtained when the delivery station scans the shipping tag on the box (from the box packaging station). While the shipping tag is generated with information such as the address, the delivery station provides an automated means for the system to scan and generate the itinerary without the need for external input from a worker. The distance is important for determining the shipping method because the drone and the self-driving vehicle can only travel a fixed distance before it needs to be charged, particularly without assistance from a person. This distance may vary depending on the model of the drone and self-driving vehicle, but it is reasonable to assume that a drone can travel up to five kilometers and that a self-driving vehicle can travel up to 320 kilometers. It should be noted that even though the drone and the self-driving vehicle can travel such distances, they would still need time to go back to a charging facility in a warehouse setting. This is important for the self-driving vehicle since the itinerary needs to incorporate multiple orders within the distance it can drive.

Figure 13:
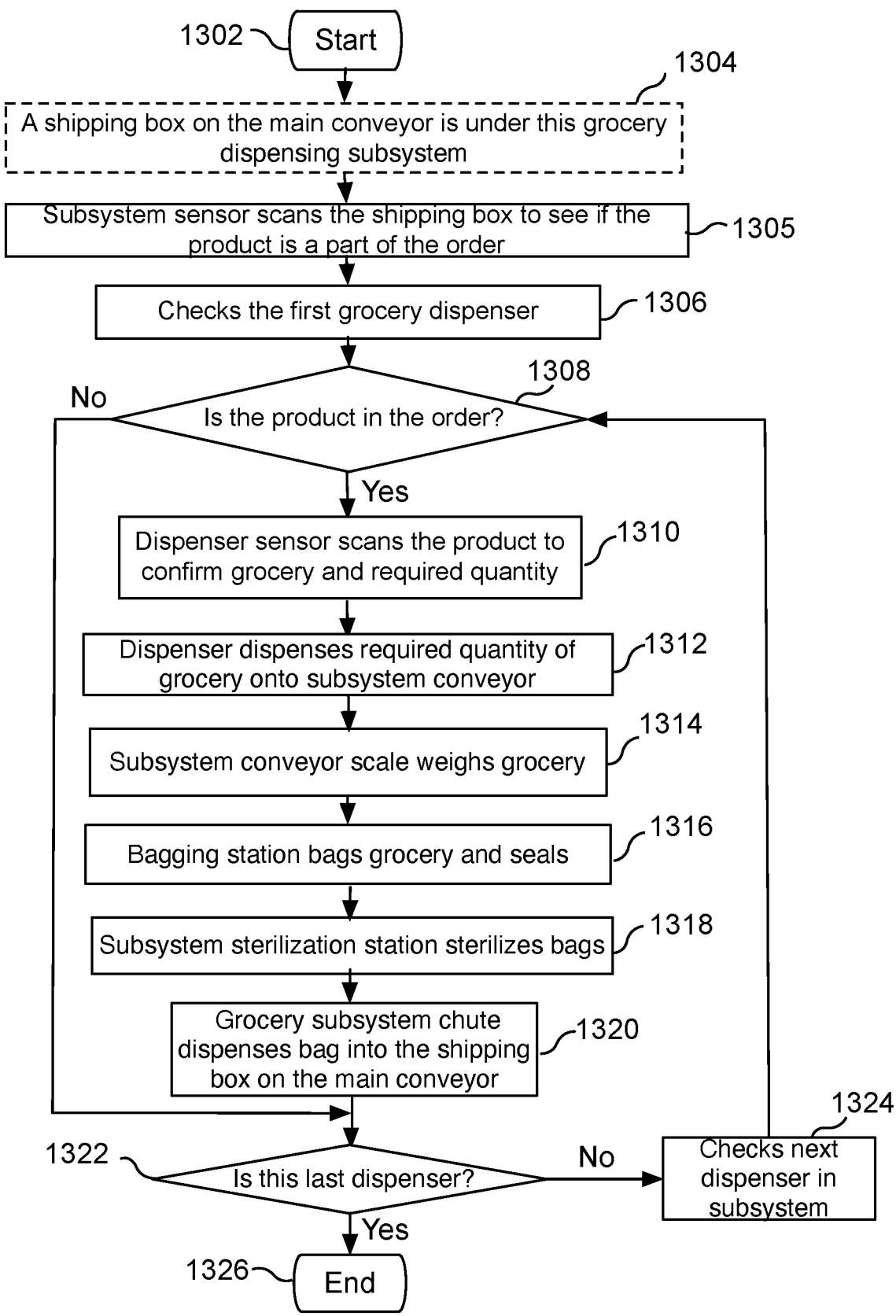
FIG. 13 illustrates a flow diagram outlining the process of dispensing, packaging, and sterilizing non-prepacked grocery products in a grocery dispensing subsystem according to the embodiment shown in FIG. 4.

FIG. 13 illustrates a flow diagram outlining the process of dispensing, packaging, and sterilizing non-prepacked grocery products in a grocery dispensing subsystem according to the embodiment shown in FIG. 4. The process starts (1302). A shipping box on the main conveyor is situated under the grocery dispensing subsystem at step (1304). At step (1305), the subsystem sensor scans the shipping box to see if the product is part of the order. The AI then checks the first grocery dispenser at step (1306). The AI then determines if the grocery product is in the order at step (1308). If it is, then the dispenser sensor scans the product to confirm the type of grocery product and the required quantity are correct at step (1310). The dispenser then dispenses the required quantity of the grocery product onto the subsystem conveyor at step (1312). At step (1314), the grocery products move on the conveyor to be weighed. The grocery products then move to the bagging station, where they are bagged and sealed at step (1316). At step (1318), the subsystem sterilization station sterilizes the grocery order bags. At step (1320), the grocery subsystem chute dispenses the bags with grocery orders into the shipping box on the main conveyor. The system then determines whether the current dispenser is the last dispenser of the grocery dispensing subsystem at step (1322). If the system determines that the current dispenser is not the last dispenser at step (1322), the system checks the next dispenser in the subsystem at step (1324) and the process repeats itself from step (1308). If the current dispenser is considered the last dispenser at step (1322), the process ends (1326).

Going back to step (1308), if the AI determines that the product is not part of the order, then the process skips to step (1322). The system then determines if the last dispenser has been met at step (1322). If it is not, then the next dispenser is checked at step (1324). If it is, then the process ends (1326).

A dashed outline is shown at step (1304) because it relates to the shipping box outside the dispensing subsystem. Furthermore, step (1304) is not reflected in FIG. 4, although it is required before the subsystem process occurs. In other words, the box's state is not part of the subsystem process itself, yet it is needed for the process to start.

Figure 14:
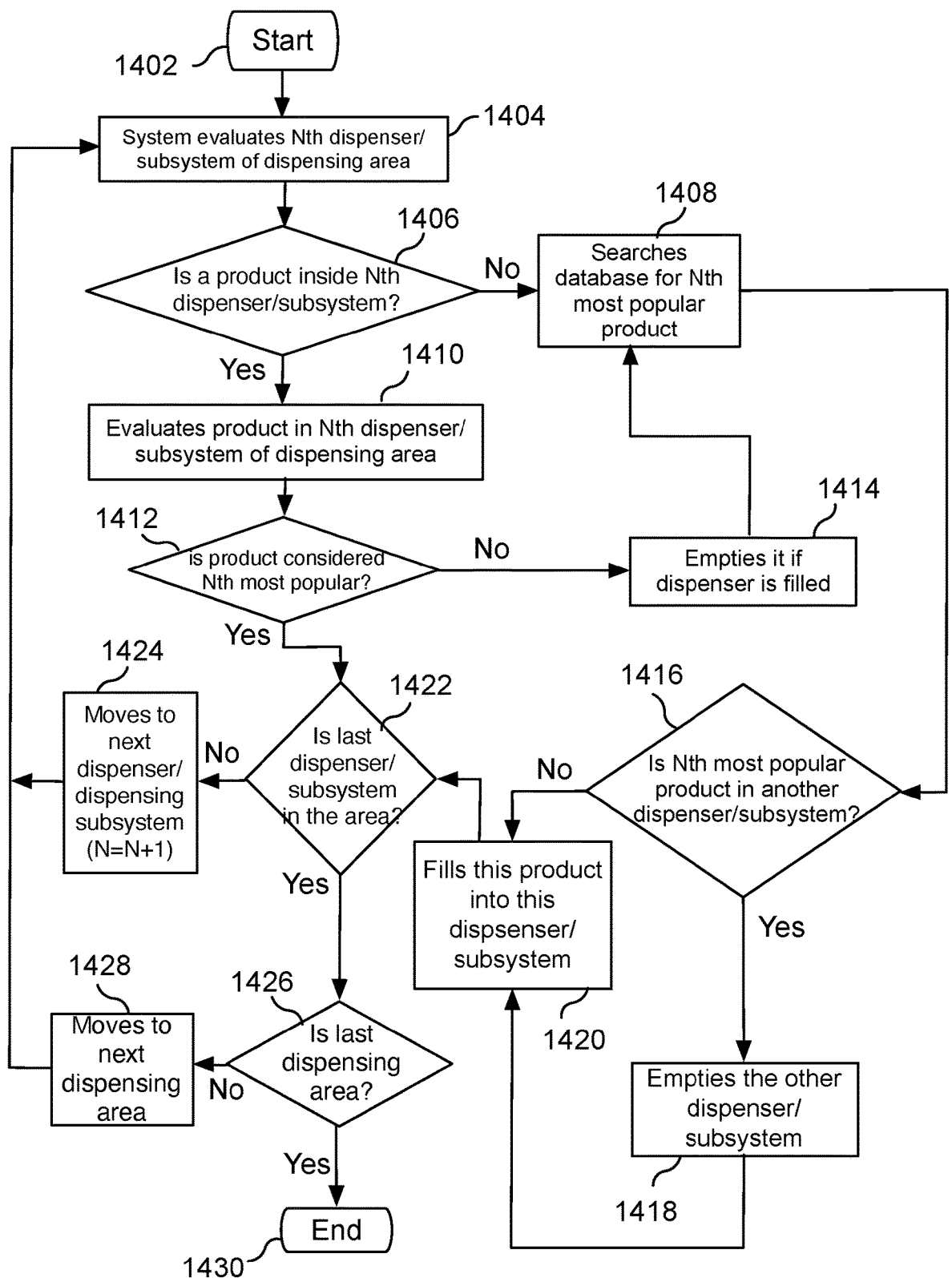
FIG. 14 illustrates a flow diagram outlining the process of the smart dispensing method for optimizing the arrangement of products among dispensers/dispensing subsystems.

FIG. 14 illustrates a flow diagram outlining the process of the smart dispensing method for optimizing the arrangement of products among dispensers/dispensing subsystems. The process starts (1402). The system, particularly the AI, evaluates an Nth dispenser/subsystem of a dispensing area at step (1404). The system determines if a product is inside the Nth dispenser/subsystem at step (1406).

In one version of the process, there is no product inside the Nth dispenser/subsystem at step (1406). The AI searches the database for the Nth most popular product at step (1408). The AI then needs to determine if the Nth most popular product is in another dispenser/subsystem at step (1416). If there is, then the dispenser/subsystem currently storing that product is emptied at step (1418). The system then fills the Nth most popular product into the Nth dispenser/subsystem at step (1420). If the Nth most popular product is not in another dispenser/subsystem at step (1410), then the process goes directly to step (1420). The system then determines at step (1422) if the dispenser/subsystem is the last one in the associated dispensing area. If it is not, the system moves on to the next dispenser/dispensing subsystem (N=N+1) at step (1424), which then repeats the process from step (1404). If it is, then the system determines if product arrangement is finished in the last dispensing area at step (1426). If not, the system moves on to the next dispensing area at step (1428), which repeats the process from step (1404). If it is, then the process ends (1430).

There is another way the process can be carried out from step (1406) onward. In this case, there is a product inside the Nth dispenser/subsystem at step (1406). The system evaluates the product in the Nth dispenser/subsystem of the associated dispensing area at step (1410). The system then determines if the product is considered the Nth most popular at step (1412). If it is not, the system empties the dispenser at step (1414), provided that the dispenser has been filled with that product. The system then searches the database for the Nth most popular product at step (1408). The AI then needs to determine if the Nth most popular product is in another dispenser or subsystem at step (1416). If there is, then the dispenser/subsystem currently storing that popular product is emptied at step (1418). The system then fills the Nth most popular product into the Nth dispenser/subsystem at (1420). The system then determines at step (1422) if the dispenser/subsystem is the last one in the associated dispensing area; the process also goes directly to this step (1422) if, at step (1412), the product in the Nth dispenser/subsystem is the Nth most popular. If there are additional dispensers/subsystems in the dispensing area at step (1422), the system moves on to the next dispenser/dispensing subsystem at step (1424), which then repeats the process from step (1404). If there are no additional dispensers/subsystems in the dispensing area at step (1422), then the system determines if product arrangement is finished in the last dispensing area at step (1426). If not, the system moves on to the next dispensing area at step (1428), which repeats the process from step (1404). If it is, then the process ends (1430).

The N value represents two things: 1) N represents the positioning of the dispenser/subsystem itself within the smart auto-vending system. Each N value represents how close a dispenser/subsystem is to the start of the system. So, a dispenser/subsystem with N=1 would be closest to the start of the system. Any dispenser/subsystem after that would be assigned a value of N=N +1, with N equal to the value of the preceding dispenser/subsystem. So, the second dispenser/subsystem (N=2) would be the one second closest to the start of the system, the third (N=3) would be third closest, and so forth; 2) N represents the products' rankings in popularity, which is stored in a database for the AI to examine. Each product is stored inside a dispenser/subsystem with a matching N value. So, a product that is the third most popular would be stored inside a dispenser/subsystem that is the third closest to the start of the system, or N=3. The ranking of such products in popularity changes constantly in a way that speeds up order fulfillment by placing items most likely to be ordered together (nearly at the beginning of the system) rather than having the dispensers/subsystems dispense items randomly stopping at locations within the dispensing areas that are far away from one another. So, a box does not have to constantly stop at dispensers/subsystems far apart from each other to get their required products. This allows the system to adapt to changing trends in products sold for sustained optimization in the order workflow. As a result of this sequential ordering of both the dispensers/subsystems and products, the order fulfillment process is sped up to get orders shipped out more quickly.

The dispensers/subsystems and the products are designated an N value. In one embodiment, each dispenser/subsystem is assigned to one Nth most popular product. One dispenser has one product and one subsystem may only have one dispenser storing one product. In another embodiment, dispensing subsystems containing a plurality of dispensers may have individual dispensers. Each dispenser among all dispensing subsystems and dispensing areas is assigned an N value based on the dispenser's position within the system. Naturally, the products assigned as 'Nth most popular' are stored in the corresponding dispensers of the same N value. For example, say there are two dispensing areas, each with three dispensing subsystems containing three dispensers per subsystem. The first dispenser in the first dispensing subsystem would be the one closest to the beginning of the dispensing area or the one closest to the start of the smart auto-vending system. In this case, this first dispenser would have an N value of 1, which means that the most popular product is stored inside it. The second and third dispensers within the first dispensing subsystem are given an N value of 2 and 3 respectively; these dispensers store the second and third most popular products, respectively. When going to the second dispensing subsystem, the first dispenser of that subsystem would be given an N value of 4, which means it stores the fourth most popular product. By the time the first dispenser of the third dispensing subsystem is reached, the first dispenser in that subsystem is given an N value of 7. Then, when going to the second dispensing area, the first dispenser in the first subsystem of the second dispensing area would be assigned an N value of 10. This continues until the last dispenser of the second dispensing area is assigned an N value of 18 for storing the least ($18^{th}$) popular product. It should be noted that the embodiments above are exemplary for illustrating how N values and Nth most popular products may be assigned to dispensers and subsystems. The method for assigning N values is not limited to the embodiments mentioned above and can be done differently in other alternative embodiments.

The products are changed on a daily basis (24 hours apart), which is how the smart auto-vending system can adapt to changing trends. The exact time for changing products can be at any suitable time (0:00 to 23:59) depending on factors like warehouse operating hours or prime time order placements. In other embodiments, this change in product placement can happen at different intervals, such as twice a day, once a week, three times a week, monthly, etc. The loading of products into the dispensers/subsystems can be done manually or with a robot, depending on the embodiment.

In other embodiments, the products can be arranged in the dispensers/subsystems based on other qualitative or quantitative factors including, but not limited to, color, size, storage conditions (e.g., refrigerated items), category (e.g., produce, meats, etc.), and various others.

The invention claimed is:

1. A method of a smart vending process, comprising:
   receiving an order from a customer, the order specifying at least one product and its quantity;
   providing a conveyor;
   providing a box station having a first plurality of shipping boxes with different types and sizes, the box station selecting a shipping box from the first plurality of shipping boxes for the order based on the product and the quantity;
   providing a dispensing area comprising a second plurality of dispensers and a third plurality of dispensing subsystems; wherein each dispensing subsystem comprises a various number of dispensers; wherein each dispenser stores one type of the products and dispenses a quantity of the products into the shipping box; wherein the dispensers dispense the products into the shipping box according to the order;
   providing a sterilization station for sterilizing the shipping boxes and the products;
   providing a packaging station for packing and sealing the shipping box after the product dispensing; wherein the packing includes the products rearrangement inside the shipping box;
   providing a shipping station to deliver the sealed shipping box;
   wherein the conveyor moves the shipping box among the stations to fulfill the order;
   wherein the box selection, product dispensing, product packing, and box delivery are all automatic;
   wherein the dispensing subsystem further comprises a subsystem sterilization station for sterilizing the product dispensed in the subsystem, and a subsystem conveyor for moving the product through the subsystem sterilization station into the shipping box; wherein each dispenser has a dispenser sensor to determine the type and quantity of the dispensed product, and enable the dispensing subsystem to ascertain that the dispensed product is according to the customer's order.

2. The method of claim 1, wherein the sterilization station selects a suitable sterilization according to the product.

3. The method of claim 1, wherein the dispensing area is optimized by sorting the plurality of dispensers dispensing subsystems according to popularity, color, size, storage conditions, temperature, humidity, category of the products stored in the dispensers/dispensing subsystems.

4. The method of claim 1, wherein a scannable code based on the order is generated and applied on the shipping box, and each product has a scannable code as well; wherein the dispenser/dispensing subsystem has a code reader to read the scannable code to get the product and order information.

5. The method of claim 4, wherein the scannable code is a barcode, RFID tag, or QR code.

6. The method of claim 1, wherein the conveyor has a predetermined length, shape, and design with a straight layout or a plurality of curves, loops, and sections with higher and lower elevations.

7. The method of claim 1, wherein the conveyor is a gravity roller conveyor or a chain conveyor arranged on a surface level or from a ceiling; wherein the conveyor is configured to be a plurality of conveyors for moving the shipping box and products between the stations.

8. The method of claim 1, wherein the dispensing subsystem provides special temperature and humidity level for the products.

9. The method of claim 2, wherein the sterilization station comprises an ultraviolet light sterilization chamber, a heat sterilization chamber, a spray sterilization chamber, or a manual cleaning station.

10. The method of claim 9, wherein the sterilization station has ability to determine the desired sterilization chamber or station and then facilitate transporting the product through the ultraviolet light sterilization chamber, the heat sterilization chamber, the spray sterilization chamber, and/or the manual cleaning station according to the type of the product.

11. The method of claim 1, wherein the dispenser sensor is a code reader.

12. The method of claim 1, wherein the subsystem dispensed product is a grocery product and/or an unpackaged product.

13. The method of claim 12, wherein the subsystems comprise a weighing machine to weigh the product dispensed by the dispenser.

14. The method of claim 12, wherein the subsystem comprises a bagging station for bagging and sealing the product dispensed by the dispenser.

15. The method of claim 1, wherein the packaging station comprises an automatic loose filler dispenser and/or an air cushion dispenser for filling up the empty space inside the shipping box.

16. The method of claim 15, wherein the step of providing the packaging station comprises providing a smart packaging robot for optimally rearranging the products dispensed in the shipping box and/or placing the loose filler or air cushions in the shipping box.

17. The method of claim 1, further comprising:
   arranging the products sequentially in the dispensing units so that the product in the first dispensing unit is most popular and the product in the last dispensing unit is least popular;
   wherein the dispensing units include the dispensers and those in the dispensing subsystems;
   wherein, the arranging the products comprise:
      generating and providing a database of the products for the dispensing area;
      arranging the database of the products in a sequential order according to their popularity, so that the first product in the database is most popular and the last product in the database is least popular or vice versa;
      assigning products in the database to the individual dispensing unit so that the first product in the database is assigned to the first dispensing unit, next product in the database is assigned to the next dispensing unit in order until all products in the database is assigned to at least one dispensing unit;
      checking if a dispensing unit has product inside it or not; filling up the dispensing unit with the assigned products if the dispensing unit has no product inside it; checking if the particular dispensing unit has an unassigned product, then emptying the dispensing unit and re-filling the dispensing unit with the assigned product; wherein the emptied unassigned product is configured to be transferred into another assigned dispensing unit; and
      performing the arranging the products at a predetermined time period to ensure an integrated and streamlined optimization.

18. The method of claim 17, wherein the arranging the products is performed whenever one or more dispensing units is empty; or there is a change in the popularity of the assigned product in any dispensing unit.

19. The method of claim 1, wherein further comprising providing a weighing machine to verify the weight of the sealed shipping box, ascertaining if the shipping box can be delivered by a delivery drone or a self-driving vehicle, providing a shipping robot for loading the shipping box on the delivery drone or the self-driving vehicle if it is ascertained that the box can be shipped by the delivery drone or the self-delivery vehicle, and automatically delivering the shipping box via the delivery drone or the self-driving vehicle to its destination.

20. A smart vending system, comprising:
- a user interface to receive an order from a customer, the order specifying at least one product and its quantity;
- a conveyor;
- a box station having a first plurality of shipping boxes with different types and sizes, the box station selecting a shipping box from the first plurality of shipping boxes for the order based on the product and the quantity;
- a dispensing area comprising a second plurality of dispensers and a third plurality of dispensing subsystems; wherein each dispensing subsystem comprises a various number of dispensers; wherein each dispenser stores one type of the products and dispenses a quantity of the products into the shipping box; wherein the dispensers dispense the products into the shipping box according to the order;
- wherein the dispensing area is optimized by sorting the plurality of dispensers dispensing subsystems according to popularity, color, size, storage conditions, temperature, humidity, category of the products, stored in the dispensers/dispensing subsystems
- a sterilization station for sterilizing the shipping boxes and the products;
- a packaging station for packing and sealing the shipping box after the product dispensing;
- wherein the packing includes the products rearrangement inside the shipping box;
- a shipping station to deliver the sealed shipping box;
- wherein the conveyor moves the shipping box among the stations to fulfill the order;
- wherein the box selection, product dispensing, product packing, and box delivery are all automatic;
- wherein the dispensing subsystem further comprises a subsystem sterilization station for sterilizing the product dispensed in the subsystem, and a subsystem conveyor for moving the product through the subsystem sterilization station into the shipping box; wherein each dispenser has a dispenser sensor to determine the type and quantity of the dispensed product, and enable the dispensing subsystem to ascertain that the dispensed product is according to the customer's order.

* * * * *